(12) United States Patent
Xu et al.

(10) Patent No.: US 11,856,472 B2
(45) Date of Patent: **\*Dec. 26, 2023**

(54) METHOD AND APPARATUS FOR CONTROLLING OR PAGING A USER EQUIPMENT

(71) Applicant: Samsung Electronics Co., Ltd., Suwon-si (KR)

(72) Inventors: Lixiang Xu, Beijing (CN); Hong Wang, Beijing (CN); Qi Li, Beijing (CN); Xiaowan Ke, Beijing (CN)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 17/832,152

(22) Filed: Jun. 3, 2022

(65) Prior Publication Data

US 2022/0303860 A1 Sep. 22, 2022

Related U.S. Application Data

(63) Continuation of application No. 16/323,901, filed as application No. PCT/KR2017/008790 on Aug. 11, 2017, now Pat. No. 11,356,918.

(30) Foreign Application Priority Data

Aug. 11, 2016 (CN) .......................... 201610656674.6
Sep. 30, 2016 (CN) .......................... 201610875588.4
Aug. 2, 2017 (CN) .......................... 201710652586.3

(51) Int. Cl.
*H04W 36/32* (2009.01)
*H04W 68/04* (2009.01)
(Continued)

(52) U.S. Cl.
CPC ............. *H04W 36/32* (2013.01); *H04W 8/08* (2013.01); *H04W 24/10* (2013.01); *H04W 48/18* (2013.01);
(Continued)

(58) Field of Classification Search
CPC ..... H04W 48/04; H04W 12/08; H04W 24/10; H04W 36/0022; H04W 36/00835;
(Continued)

(56) References Cited

U.S. PATENT DOCUMENTS 6,073,010 A \* 6/2000 Dufour ................. H04W 84/14
455/433
2008/0119209 A1 5/2008 Upp
(Continued)

FOREIGN PATENT DOCUMENTS

| CN | 1968501 A | 5/2007 |
|---|---|---|
| CN | 102137424 A | 7/2011 |
| WO | 2015/138859 A1 | 9/2015 |

OTHER PUBLICATIONS

European Search Report dated Nov. 11, 2019, issued in European Application No. 17839876.4-1214 / 3482576.
(Continued)

*Primary Examiner* — Awet Haile
(74) *Attorney, Agent, or Firm* — Jefferson IP Law, LLP

(57) ABSTRACT

A communication method and system for controlling and paging a user equipment (UE) are provided. The method includes receiving mobility level information of a UE, and performing at least one of handover control, measurement control, or paging for the UE according to mobility level information of the UE.

8 Claims, 19 Drawing Sheets

(51) Int. Cl.
*H04W 8/08* (2009.01)
*H04W 24/10* (2009.01)
*H04W 48/18* (2009.01)
*H04W 68/00* (2009.01)
*H04W 8/22* (2009.01)
*H04W 48/04* (2009.01)
*H04W 60/04* (2009.01)
*H04W 88/08* (2009.01)

(52) U.S. Cl.
CPC ......... *H04W 68/005* (2013.01); *H04W 68/04* (2013.01); *H04W 8/22* (2013.01); *H04W 48/04* (2013.01); *H04W 60/04* (2013.01); *H04W 88/08* (2013.01)

(58) Field of Classification Search
CPC ..... H04W 48/16; H04W 68/00; H04W 68/02; H04W 68/04; H04W 68/06; H04W 76/36; H04W 8/08; H04W 8/22; H04L 12/1407; H04L 41/082
See application file for complete search history.

(56) References Cited

U.S. PATENT DOCUMENTS

| | | | |
|---|---|---|---|
| 2010/0124926 A1 | 5/2010 | Klatt et al. | |
| 2010/0202406 A1* | 8/2010 | Feder | H04W 36/00835 370/331 |
| 2011/0026484 A1 | 2/2011 | Fox et al. | |
| 2011/0122859 A1* | 5/2011 | Song | H04W 68/00 370/338 |
| 2011/0149926 A1* | 6/2011 | Li | H04W 48/04 370/338 |
| 2011/0261786 A1* | 10/2011 | Bontu | H04W 48/02 370/331 |
| 2013/0121241 A1 | 5/2013 | Sebire | |
| 2013/0178213 A1 | 7/2013 | Li | |
| 2014/0243026 A1 | 8/2014 | Essigmann | |
| 2015/0031369 A1* | 1/2015 | Gunnarsson | H04W 36/04 455/438 |
| 2015/0110041 A1 | 4/2015 | Ren et al. | |
| 2016/0309448 A1* | 10/2016 | Truelove | H04W 8/22 |
| 2016/0360438 A1 | 12/2016 | Yiu et al. | |
| 2017/0353989 A1* | 12/2017 | Kim | H04W 36/0022 |
| 2018/0020418 A1 | 1/2018 | Chandramouli et al. | |
| 2019/0045368 A1 | 2/2019 | Zhou et al. | |
| 2019/0268878 A1* | 8/2019 | Nakazawa | H04W 72/04 |
| 2019/0342827 A1 | 11/2019 | Kim et al. | |
| 2020/0037148 A1* | 1/2020 | Wang | H04W 76/25 |
| 2020/0275315 A1* | 8/2020 | Futaki | H04W 24/10 |

OTHER PUBLICATIONS

LG Electronics: "Migration solution with Evolved E-UTRAN to operator with an EPC and a NextGen Core simultaneously", 3GPP Draft; S2-164423_INTERWORKING_V2, 3rd Generation Partnership Project (3GPP), Mobile Competence Centre; 650, Route Des Lucioles ; F-06921 Sophia-Antipolis Cedex ; France vol. SA WG2, No. Sanya, P.R China; Aug. 29, 2016-Sep. 2, 2016, Aug. 27, 2016, XP051141588.

Qualcomm Incorporated et al.: "Solution for interworking and migration", 3GPP Draft; S2-164246-WAS-S2-164189-WAS-S2-164018-WASS2-163391_NGKI18-IWM_V7, 3rd Generation Partnership Project (3GPP), Mobile Competence Centre; 650, Route Des Lucioles ; F-06921 Sophia-Antipolis, vol. SA WG2, No. Vienna; Jul. 11, 2016-Jul. 15, 2016, Jul. 17, 2016, XP051121869.

Qualcomm Incorporated (Email Discussion Convenor): "Summary of email discussion about "Interworking, Migration and Roaming—Converging on Interworking solutions"", 3GPP Draft; S2-164533 Convener IWM Discussion 5B, 3rd Generation Partnership Project (3GPP), Mobile Competence Centre; 650, Route Des Lucioles ; F-06921 Sophia-Antipolis Cedex ; France, vol. SA WG2, No. Sanya, China; Aug. 29, 2016-Sep. 2, 2016, Aug. 27, 2016, XP051141609.

European Search Report dated Sep. 7, 2020, issued in European Application No. 20178538.3-1212.

Chinese office Action dated Mar. 2, 2022, issued in Chinese Application No. 201710652586.3.

Samsung, 3GPP TSG RAN WG2 #93bis R2-162226, "Discussion on Beam Measurement and Tracking for 5G New Radio Interface in mmWave Frequency Bands" Apr. 15, 2016.

Notice of Allowance dated Jul. 27, 2022, in Chinese Application No. 201710652586.3.

* cited by examiner

METHOD AND APPARATUS FOR CONTROLLING OR PAGING A USER EQUIPMENT

CROSS-REFERENCE TO RELATED APPLICATION(S)

This application is a continuation application of prior application Ser. No. 16/323,901, filed on Feb. 7, 2019, which is a National Stage application under 35 U.S.C. § 371 of an International application number PCT/KR2017/008790, filed on Aug. 11, 2017, which is based on and claims priority under 35 U.S.C § 119(a) of a Chinese patent application number 201610656674.6, filed on Aug. 11, 2016, in the Chinese Intellectual Property Office, and of a Chinese patent application number 201610875588.4, filed on Sep. 30, 2016, in the Chinese Intellectual Property Office, and of a Chinese patent application number 201710652586.3, filed on Aug. 2, 2017, in the Chinese Intellectual Property Office, the disclosure of each of which is incorporated by reference herein in its entirety.

TECHNICAL FIELD

The present disclosure relates to radio communications and in particular to a method and apparatus for controlling or paging a user equipment (UE).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communication technologies more and more tend to provide users with multimedia services at high transmission rates. FIG. 1 shows a diagram of a system architecture evolution (SAE) system architecture.

In FIG. 1, a user equipment (UE) 101 is a terminal device for receiving data. An evolved universal terrestrial radio access network (E-UTRAN) 102 is a radio access network which includes a macro base station (eNodeB/NodeB) that provide an interface for the UE to access a radio network. A mobility management entity (MME) 103 is responsible for managing a mobility context, a session context and security information of the UE. A serving gateway (SGW) 104 is responsible for providing user plane functions. The MME 103 and the SGW 104 may be located in a same physical entity. A packet data network gateway (PGW) 105 is responsible for functions such as charging and lawful interception, and it may be located in a same physical entity with the SGW 104 too. A policy and charging rules function (PCRF) entity 106 is responsible for providing quality of service (QoS) policies and charging rules. A serving general packet radio service (GPRS) support node (SGSN) 108 is a network node device that provides routing for data transmissions in a universal mobile telecommunications system (UMTS). A home subscription server (HSS) 109 is a home subscription subsystem of the UE, and it is responsible for protecting user information such as a current location of the UE, an address of a serving node, user security information, and a packet data context of the UE.

5G refers to the fifth generation of mobile communication technology. Different from the previous four generations, 5G is not a single wireless technology but a fusion of existing wireless communication technologies. At present, the peak rate in the LTE can be up to 100 Mbps, and the peak rate in 5G will be up to 10 Gbps, which is improved by 100 times in comparison to 4G. Due to the limited spontaneous processing capability, the existing 4G network is unable to support some services, such as high-resolution video, high-quality voice, augmented reality and virtual reality. 5G will introduce more advanced technologies, satisfy the demands for traffic growth of mobile services by higher spectrum efficiency, more spectrum resources, denser cells or more, solve the problems in the 4G network, and establish a network society with high transmission rate, high capability, low delay, high reliability and excellent user experience. As shown in FIG. 1, the 5G architecture contains a 5G access network and a 5G core network, and a User Equipment (UE) communicates with a data network through the access network and the core network.

An initial overall architecture of the 5G is shown in FIG. 2. It includes a next generation (NextGen) UE (also called 5G UE), a next generation access network (also called 5G access network) or next generation radio access network (Next Gen(R)AN), a next generation core network (Next-Gen Core) (also called 5G core network), and a data network. The UE communicates with the data network through the access network and the core network.

A control plane interface between the Next Gen(R)AN and the NextGen Core is NG2, and a user plane interface between the Next Gen(R)AN and the NextGen Core is NG3. The names of these interfaces are only temporarily named, and if the 3rd generation partnership project (3GPP) finally decides to use other names, the main content of the present disclosure is not affected. The NextGen Core further includes a user plane function entity and a control plane function entity, where the Next Gen (R)AN represents NextGen AN or NextGen RAN.

In a next generation mobile communication system, in order to distinguish UE mobility, UE mobility levels are proposed. The UE mobility levels may include:

No mobility: a UE is static or semi-static, and the UE can only access a network through a fixed access point;

Restricted mobility: a UE moves within a pre-configured permitted geographical area, e.g., an area in a tracking area (TA) list; and Unrestricted mobility: a UE can move freely, that is, there is not a permitted geographical area pre-configured for the UE.

The UE mobility level of a UE is determined by the NextGen Core according to capabilities of the UE, service demand information of the UE, operator strategies, and subscription information of the UE. During an attachment or service request procedure of the UE, the NextGen Core sends a decided UE mobility level to the UE. In this way, the UE can perform corresponding mobility operations according to the UE mobility level.

DISCLOSURE OF INVENTION

Technical Problem

At present, in the next generation mobile communication system, the number of UEs will be greatly increased, and operations for the UEs, such as measurement control, handover and paging, will consume a lot of system resources, which decreases overall transmission performance of the system and may not be able to meet UE transmission requirements.

In addition, in the network evolution, the LTE base stations will be continuously used in the first stage; meanwhile, 5G UEs can be supported, and 5G features can be used. Therefore, it is attractive to and expected by the operators to upgrade the LTE base stations to support the 5G features. In order to upgrade the LTE base stations such that the LTE base stations can be connected to the 5G core network, the following problems are to be solved:

1) how to select a proper core network for a terminal;
2) how to realize coordination between an enhanced LTE base station and a 5G base station;
3) how to establish a horizontal interface between an enhanced LTE base station and another enhanced LTE base station; and
4) how to inform a UE of using a proper protocol.

Solution to Problem

The present disclosure provides a method for controlling or paging a UE, so as to save system resources and improve overall system performance.

To achieve the above objects, the present disclosure adopts the following technical schemes:

A method for controlling or paging a user equipment (UE), includes:
  receiving, by an access network node, mobility level information of a UE;
  performing, by the access network node, handover control and/or measurement control and/or paging operation for the UE according to mobility level information of the UE.

Preferably, mobility level information of the UE includes no mobility, restricted mobility, or unrestricted mobility.

Preferably, in response to mobility level information of the UE being no mobility, mobility level information of the UE further includes: no mobility at all, or the UE only moving within a scope of a current cell, current tracking area (TA), or current base station;
  and/or
  in response to mobility level information of the UE being restricted mobility, mobility level information of the UE further includes: an identifier of a geographical area where the UE is allowed to move; in which the identifier of the geographical area is an identifier of a TA or base station.

Preferably, in response to mobility level information of the UE including the UE only moving within the scope of the current cell, mobility level information of the UE further includes a cell identifier of a cell where the UE is located;
  and/or, in response to mobility level information of the UE including the UE only moving within the scope of the current TA, mobility level information of the UE further includes a TA identifier of a TA where the UE is located.

Preferably, performing handover control for the UE includes:
  in response to mobility level information of the UE including no mobility, or in response to mobility level information of the UE including no mobility at all, or in response to mobility level information of the UE including no mobility and the UE only moving within the scope of the current cell, the access network node not performing handover for the UE; and/or
  in response to mobility level information of the UE including no mobility, and the UE only moving within the scope of the current TA or current base station, then the access network node not performing handover to other TAs or base stations other than the TA or base station where the UE is located; and/or,
  in response to mobility level information of the UE including restricted mobility, then the access network node not performing handover to a cell outside of a specified geographical area for the UE; in which the specified geographical area is a geographical area configured for the UE where the UE is allowed to move.

Preferably, performing measurement control for the UE includes:
  in response to mobility level information of the UE including no mobility, or in response to mobility level information of the UE including no mobility at all, or in response to mobility level information of the UE including no mobility and the UE only moving within the scope of the current cell, then the access network node not configuring a measurement for the UE; and/or, in response to mobility level information of the UE including no mobility and the UE only moving within the scope of the current TA or current base station, then the access network node only containing a cell or frequency in the TA or base station where the UE is located in a message for configuring the UE to perform a measurement; and/or, in response to mobility level information of the UE including restricted mobility, then the access network node only containing a cell or frequency within the specified geographical area in the message for configuring the UE to perform a measurement; in which the specified geographical area is a geographical area configured for the UE where the UE is allowed to move.

Preferably, performing the paging operation for the UE includes:

in response to mobility level information of the UE including no mobility, or in response to mobility level information of the UE including no mobility at all, or in response to mobility level information of the UE including no mobility and the UE only moving within the scope of the current cell, then after the access network node receiving a paging message for the UE, the access network node only paging the UE within respective cells under an access point of the UE, or only paging the UE within a cell where the UE is located; and/or, in response to mobility level information of the UE including no mobility, and the UE only moving within the scope of the current TA or current base station, then after the access network node receiving a paging message for the UE, the access network node only paging the UE within cells of a TA or base station where the UE is located; and/or in response to mobility level information of the UE including no mobility, and the UE only moving within the scope of the current TA or base station, then in response to the access network node requiring to send a paging message to other access network nodes, the access network node sending the paging message to an access network node which controls a cell within the specified geographical area;

in response to mobility level information of the UE including restricted mobility, then after the access network node receiving a paging message for the UE, the access network node only paging the UE in a cell within the specified geographical area; and in response to mobility level information of the UE including restricted mobility, then when the access network node requiring to send a paging message to other access network nodes, the access network node sending the paging message to an access network node which controls a cell within the specified geographical area; wherein the specified geographical area is a geographical area configured for the UE where the UE is allowed to move.

Preferably, during an attachment procedure of the UE, the access network node receives mobility level information of the UE.

Preferably, after the access network node receives mobility level information of the UE, the method further includes: the access network node receiving updated mobility level information of the UE, and the access network node using updated mobility level information of the UE to update saved mobility level information of the UE.

Preferably, updating mobility level information of the UE is triggered by a handover procedure happening between different cells or different access network nodes;

or, updating mobility level information of the UE is triggered by a service demand or mobility demand of the UE;

or, updating mobility level information of the UE is triggered by information received by the core network node from a higher layer or operator.

Preferably, the access network node receiving mobility level information of the UE includes:

the access network node receiving mobility level information of the UE sent by a core network node or the UE;

and/or, the access network node receiving updated mobility level information of the UE includes: the access network node receiving updated mobility level information of the UE from the core network node or the UE.

An apparatus for controlling or paging a user equipment (UE), includes: a receiving unit and a controlling unit; in which the receiving unit is configured to receive mobility level information of the UE; and the controlling unit is configured to perform handover control and/or measurement control and/or paging for the UE according to mobility level information of the UE.

As is seen from the foregoing technical schemes, in the present disclosure, an access network node receives mobility level information of a UE; and the access network node performs handover control, and/or measurement control, and/or paging for the UE according to mobility level information of the UE. Through the foregoing schemes, when the access network node performs handover control, measurement control, and paging for the UE, it performs according to mobility level information of the UE, so that handover, measurement, and paging operations are limited in a scope corresponding to a mobility level of the UE according to mobility characteristics of the UE, which reduces unnecessary resource consumption, and improves overall system performance.

The present further provides a method for providing a new service based an enhanced LTE base station and a corresponding device.

For this purpose, an embodiment of the present disclosure provides a method for selecting a core network for a UE by an enhanced LTE base station, comprising the following steps of:

establishing a radio resource control (RRC) connection to a UE;

selecting a core network corresponding to the UE according to a preset condition;

receiving a response message transmitted by the corresponding core network; and transmitting a RRC configuration message to the UE to configure or reconfigure a user plane for the UE.

Another embodiment of the present disclosure provides a method for establishing a secondary base station for a UE by an enhanced LTE base station, comprising the following steps of:

transmitting a secondary base station addition request message to a secondary base station with an X2 interface;

receiving a secondary base station addition response message transmitted by the secondary base station with the X2 interface, the secondary base station addition response message carrying configuration information for a UE provided by the secondary base station;

transmitting, to the UE, a RRC message carrying configuration information for the UE provided by the secondary base station with the X2 interface;

receiving the RRC message transmitted by the UE after new configuration information is successfully configured; and transmitting a response message to the secondary base station with the X2 interface.

Still another embodiment of the present disclosure provides a method for establishing a horizontal interface between an enhanced LTE base station and a neighboring base station, comprising the following steps of:

transmitting an X2 interface or non-X2 interface establishment request message, the X2 interface or non-X2 interface establishment request message containing an identifier of an enhanced LTE base station and information about cells in the enhanced LTE base station; and receiving an X2 interface or non-X2 interface establishment response message transmitted by a neighboring base station, the X2 interface or non-X2 interface establishment response message containing an identifier of the neighboring base station and information about cells in the neighboring base station.

Yet another embodiment of the present disclosure provides a method for informing a UE about how to configure protocol by an enhanced LTE base station, comprising the following steps of:

transmitting, to a UE, a notification message that the access network of the UE can provide 5G features; and receiving a RRC message transmitted by the UE, and acquiring a non-access stratum message carried by the RRC message so that the UE configures a protocol matched with the access network of the UE.

Compared with the prior art, the solutions of the present disclosure have the following advantages:

1. the method for selecting a core network provided by the present disclosure can select a proper core network for a terminal;
2. the method for establishing a secondary base station provided by the present disclosure can realize coordination between an enhanced LTE base station and a 5G base station;
3. by the method for establishing a horizontal interface provided by the present disclosure, the establishment of a horizontal interface between an enhanced LTE base station and another neighboring base station is realized; and
4. by the method for informing a terminal-configured protocol provided by the present disclosure, a terminal can use a proper protocol for communication.

Advantageous Effects of Invention

Based on the functions realized by the methods, a 5G terminal can use the 5G features to increase the amount of user data and the utilization rate of network frequency.

Additional aspects and advantages of the present disclosure will be partially appreciated and become apparent from the description below, or will be well learned from the practices of the present disclosure.

MODE FOR THE INVENTION

To make the objects, technical means and advantages of the present disclosure more clear, the present disclosure will be further illustrated in combination with the attached drawings.

In traditional next generation of communication systems, various kinds of measurement control, handover, and paging operations for UEs of different mobility levels are processed in the same way. However, if mobility levels of UEs are different, corresponding mobility scopes of the UEs are different, and measurement, handover, and paging operations performed in a scope, to which a UE will not move, are actually useless but cost a lot of system resources. Besides of these, the UE may also perform some unnecessary operations and consume unnecessary power. Based on these, the basic idea of the present disclosure is that when measurement control, handover, and paging operations for a UE are performed, they are performed according to a mobility level of the UE, and the measurement control, handover, and paging operations are restricted to a mobility scope corresponding to the mobility level.

Figure 1:
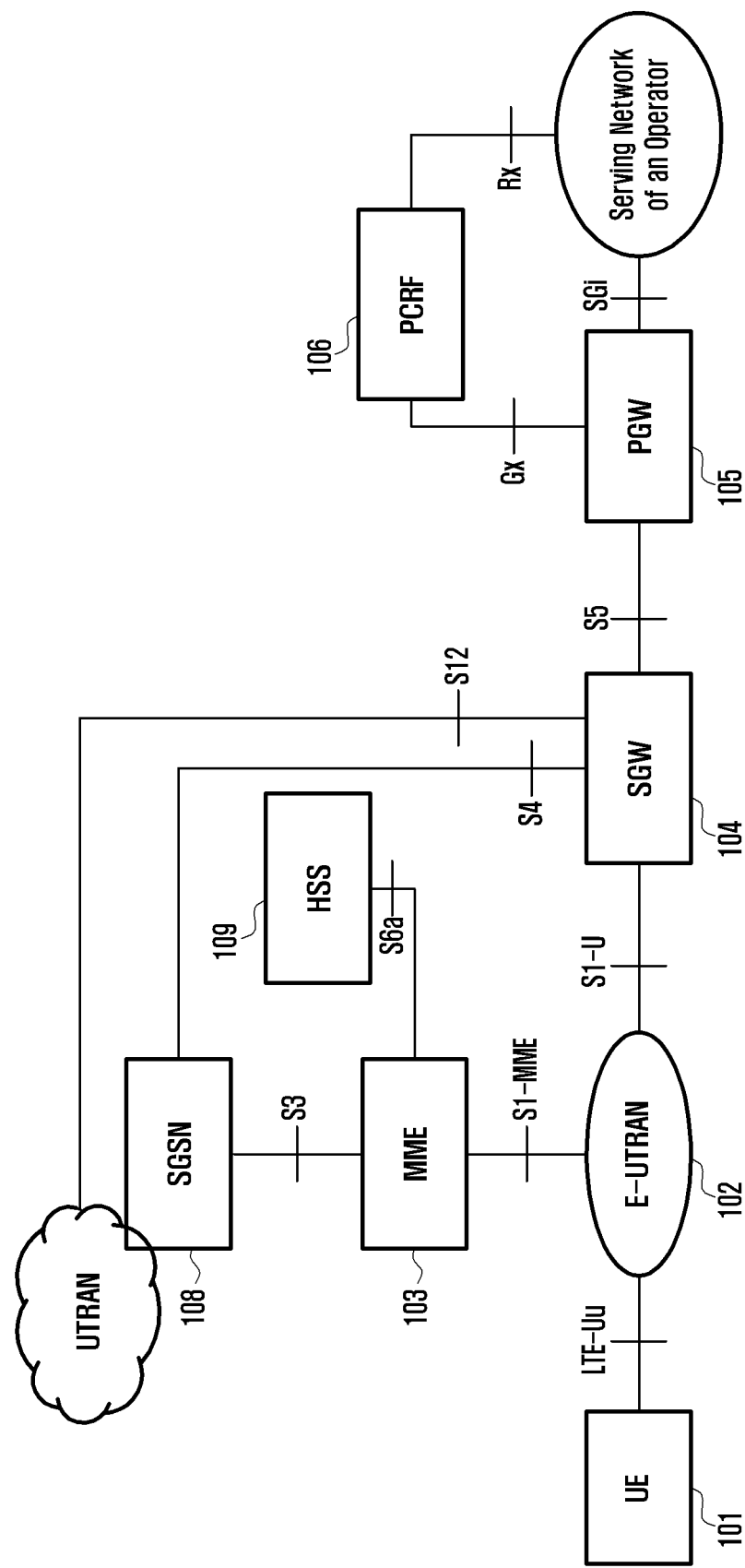
FIG. 1 is a schematic diagram of a SAE system architecture.
Figure 2:
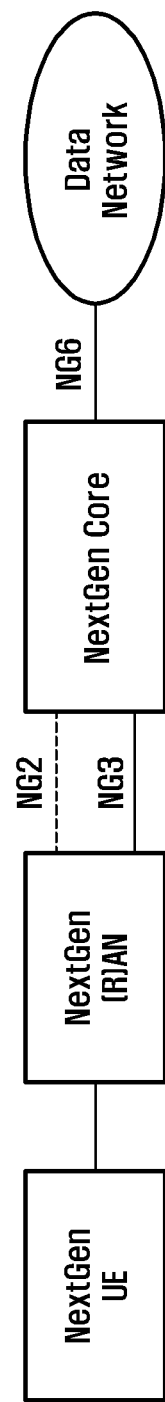
FIG. 2 is a schematic diagram of an initial overall architecture of 5G.
Figure 3:
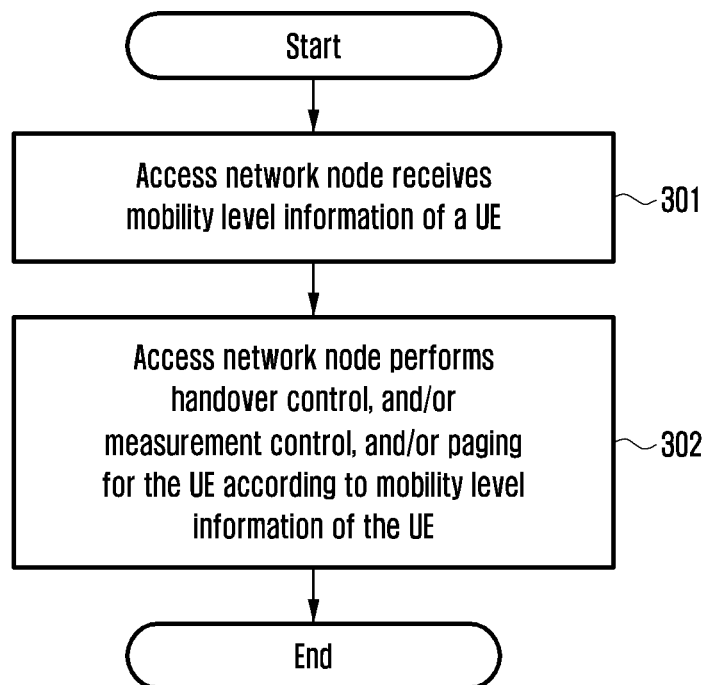
FIG. 3 is a schematic diagram of a basic flow of a method for controlling or paging a UE according to the present disclosure.

More specifically, in the traditional art, the NextGen (R)AN does not know mobility levels of UEs, and thus cannot perform different control operations for UEs of different mobility levels. Based on the above analysis, the present disclosure provides a method for controlling or paging a UE, as described in FIG. 3. The method includes the following steps.

In step 301, an access network node receives mobility level information of a UE.

Mobility level information of the UE may include information regarding whether the UE is no mobility, restricted mobility, or unrestricted mobility. These three types of information correspondingly indicate that the UE is in three different mobility levels A, B, and C.

When the UE is in a mobility level of no mobility (i.e., mobility level A), the mobility level may represent only one mobility level, or may be further divided into a plurality of levels (e.g., mobility levels A1 and A2). Specifically, when the mobility level A can be further divided into a plurality of levels, mobility level information of the UE may further include information of no mobility at all or a unit of no mobility of the UE (e.g., a cell or a TA or a base station, that is, the UE moves only within a scope of the cell, the TA, or the base station), to distinguish the different levels under the mobility level A. If the unit of no mobility of the UE is TA (i.e., the UE moves only within a scope of a current TA), then mobility level information of the UE also contains information regarding which TA, outside of which the UE does not move, i.e., a TA identifier of the TA where the UE is located. If the unit of no mobility of the UE is cell (i.e., the UE moves only within a scope of a current cell), then information of the mobility level of the UE also contains information regarding which cell, outside of which the UE does not move, i.e., a cell identifier of the cell where the UE is located. If the unit of no mobility of the UE is base station (i.e., the UE moves only within a scope of a current base station), then mobility level information of the UE indicates that the UE does not move outside of the scope of the current base station. No mobility at all herein may be understood as the UE absolutely does not move, or the UE does not move in a certain period.

When the UE is in a mobility level of restricted mobility (i.e., mobility level B), mobility level information may include information regarding geographical areas where the UE can move, i.e., including identifiers of geographical areas where the UE is allowed to move. The geographical areas may be base stations or TAs.

The access network node (e.g., NextGen (R)AN) may determine whether the UE moves and may determine a corresponding mobility scope by mobility level information of the UE described above.

In addition, it is to be specified that when the mobility level A is divided into a plurality of levels, the meaning of no mobility may mean that the UE does not move from the point of view of the access network node. That is, the UE does not move relatively to the current base station. Therefore, for no mobility in the mobility level, the mobility scope of the UE may correspond to a variety of situations where the UE absolutely does not move, the UE does not move outside of the scope of a cell, the UE does not move outside of the scope of a TA, and the UE does not move outside of the scope of a base station. The variety of situations may not all be included, or only a part of them are included, e.g., the UE does not move outside of the scope of a cell, TA or base station. Accordingly, for the mobility level B, an identifier of a geographical area where the UE is allowed to move included in mobility level information corresponding to the mobility level B is: identifiers of all TAs where the UE is allowed to move, or an indication indicating allowing the UE moves within the scope of the current base station.

When the mobility level A represents only one mobility level (e.g., no mobility at all), for the mobility level B, an identifier of a geographical area where the UE is allowed to move included in mobility level information corresponding to the mobility level B is: an identifier of a base station or TA.

Preferably, the access network node maintains received mobility level information of the UE.

Mobility level information of the UE received by the access network node may be transmitted from the core network node (e.g., Next Gen Core in the 5G system) or the UE.

In step 302, the access network node performs handover control, and/or measurement control, and/or paging for the UE according to mobility level information of the UE.

For UEs of different mobility levels, when corresponding handover control, and/or measurement control, and/or paging is/are performed, corresponding handover, measurement and paging may be restricted to a mobility scope corresponding to the mobility level of the UE.

Specifically, based on the plurality of situations of mobility level information listed in step 301, the following schemes may be used to perform handover control, and/or measurement control, and/or paging. When the mobility level is no mobility, the mobility level may correspond to one mobility level, or may be further divided into a plurality of mobility levels (for example, a unit of no mobility is cell, TA, or base station).

1. For a UE that does not move (only corresponding to one mobility level), or for a UE that does not move at all, or for a UE that does not move and a unit of no mobility thereof is cell (i.e., the UE moves only within the scope of a current cell): an access network node (e.g., a Next Gen (R)AN of a 5G system) does not need to configure a measurement for the UE, which can greatly reduce measurement control and transmission of measurement reports through an air interface and save radio resources, and the UE does not need to perform an inter-cell or inter-frequency radio measurement and report a measurement to avoid unnecessary power consumption; the access network node does not need to initiate a handover operation for the UE; and if the access network node receives a paging message for a corresponding UE from another network node, then the access network node only pages the UE within respective cells of the access network node, or within a cell where the UE is located.

2. For a UE that does not move and a unit of no mobility thereof is TA or base station (i.e., the UE only moves within the scope of a current TA or current base station): an access network node configures a measurement message for the UE to only include cells or frequencies of a TA or base station where the UE is located; when the access network node decides to trigger a handover for the UE, the access network node does not initiate handover of the UE to a TA or base station where the UE cannot located, that is, the access network node does not initiate handover-of the UE to other TAs or base stations other than the TA or base station where the UE is located; when the access network node receives a paging message for the UE, the access network node only sends a paging message in cells of the TA or base station where the UE is located; and when the access network node needs to send a paging message to another access network node, the access network node sends a paging message to an access network node that controls cells in a specified geographical area. Here, the specified geographical area refers to a geographical area, in which a UE is configured to be allowed to move by the network.

3. For a UE that has restricted mobility: an access network node configures a measurement message for the UE to only include cells or frequencies of a specified geographical area configured for the UE by the network; when the access network node decides to trigger a handover, the access network node does not initiate handover of the UE to a cell of a geographical area where the UE cannot located, that is, the access network node does not initiate handover of the UE to other cells outside of the specified geographical area; when the access network node receives a paging message for the UE, the access network node only sends a paging message in cells within the specified geographical area; and when the access network node needs to send a paging message to another access network node, the access network node sends a paging message to an access network node that controls cells in the specified geographical area. Here, the specified geographical area refers to a geographical area, in which a UE is configured by the network to be allowed to move.

For unrestricted mobility, the access network node does not need to consider the above-mentioned geographical area restrictions when configuring a UE's measurement, controlling the UE' handover, or transmitting a paging message.

At this point, the description of the method for controlling and paging a UE according to the present disclosure is completed. The above method may be used in LTE, 5G and later communication systems. Through this method, it is possible to prevent an access network node from unnecessarily configuring measurements for a UE, triggering an unnecessary handover operation, avoiding paging in some cells and saving air interface resources. Meanwhile, the method can avoid unnecessary measurements and measurement reports of the UE, and avoid power consumption.

Detailed implementation of the method of the present application will be illustrated by several embodiments in the following. For description purpose, the method of the present disclosure will be described from an aspect of interactions of multiple physical entities. In the following embodiments, the 5G system is used as an example. Assume that the access network node is a Next Gen (R)AN, the core network node is a Next Gen Core, and mobility level information of the UE is sent to the Next Gen (R)AN. Of course, detailed implementation in practice is not limited hereto. In the above method, the NextGen Core may transmit mobility level information to the NextGen (R)AN through a UE attachment process, which will be described in detail by Embodiment 1.

Figure 4:
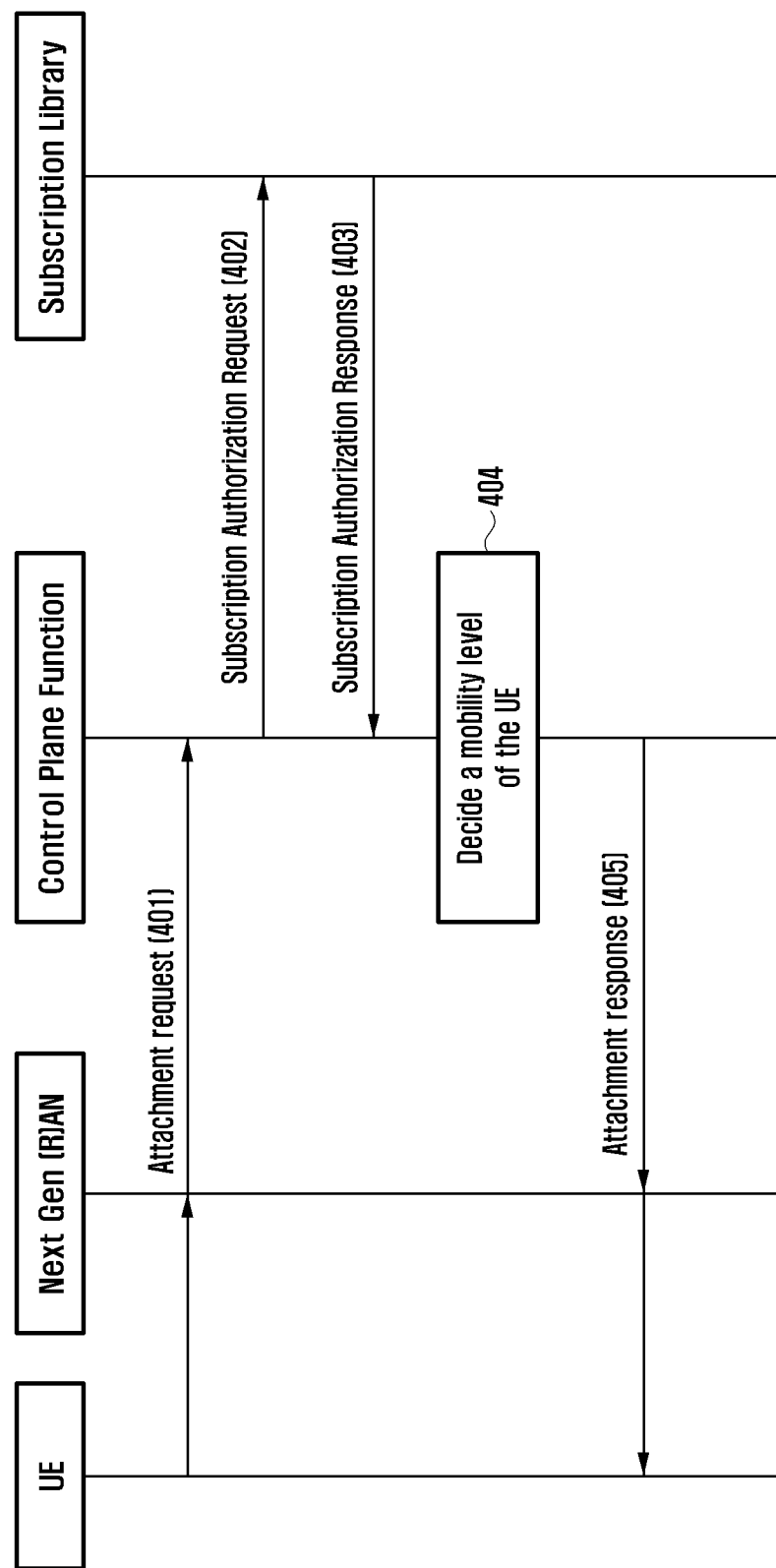
FIG. 4 is a schematic diagram of Embodiment 1 of the present disclosure.

Embodiment 1 of the present disclosure which supports handover and paging is as described in FIG. 4. The method includes the following steps:

Step 401, a UE sends an attachment request message to a 5G core network control plane function entity via a Next Gen (R)AN. The attachment request message includes capability information of the UE, mobility demand information of the UE, service demand information of the UE, and/or the location information of the UE.

As mentioned earlier, a NextGen Core includes a 5G core network control plane function entity and a user plane function entity. In this process, it is a 5G core network control plane function entity that performs interactions between the UE and the Next Gen(R)AN.

Step 402, the 5G core network control plane function entity sends a subscription authorization request message to a subscription library.

Step 403, the subscription library sends a subscription authorization response message to the 5G core network control plane function entity. The subscription authorization response message sent by the subscription library to the 5G core network control plane function entity contains subscription information that can determine a mobility level of the UE.

Step 404, the 5G core network control plane function entity determines a mobility level of UE. The 5G core network control plane function entity determines the mobility level of the UE according to the information obtained from the UE, operator policy information and/or user subscription information. Information obtained from the UE contains one or more pieces of information obtained from the UE in step 401.

Step 405, the 5G core network control plane function entity sends a non-access stratum attachment response message to the Next Gen(R)AN via a NG2 message.

Here, NG2 refers to an interface between the 5G core network control plane function entity and the Next Gen(R)AN. Even if the interface may use a different name in the future, it will not affect the main content of the present disclosure. The NG2 message contains mobility level information of the UE and the non-access stratum attachment response message. Mobility level information of the UE in this step is the same as that in step 301, and will not be described here. The 5G core network control plane function entity may also send mobility level information of the UE and the attachment response message to the Next Gen(R)AN via different NG2 messages. The Next Gen(R)AN saves the received mobility level information of the UE. The 5G core network control plane function entity sends mobility level information of the UE to the UE by the attachment response message. The Next Gen(R)AN does not resolve the attachment response message, but forwards the attachment response message directly. Mobility level information of the UE is the same as that in step 301, and will not be described here.

How the Next Gen(R)AN uses saved mobility level information of the UE is the same as that in step 302, and will not be described here.

The Next Gen(R)AN sends the attachment response message to the UE via an air interface message.

For a mobility level of no mobility, the UE does not need to perform a mobility-based area update procedure. After the attachment procedure is completed, the UE is permanently connected to the network unless the network updates the mobility level of the UE or the UE successfully performs an updated attachment procedure.

For a UE of restricted mobility, the behavior of the UE is similar to that of a UE of no mobility. A difference is that after the attachment procedure, services can be provided within a location area provided to the UE. Depending on information of an area configured to the UE, the UE may report area update.

At this point, the description of Embodiment 1 of the present disclosure is completed. With this method, it is possible to prevent the Next Gen(R)AN from configuring unnecessary measurements of UEs, triggering unnecessary handover, and paging in some cells, and thus saves air interface resources, avoids unnecessary measurements and measurement reports of the UEs, and avoids power consumption.

In addition, the mobility level information of a UE can be updated. It is updated by the core network node or UE as required, and then sent to the access network node. This case will be described in the following by several embodiments. A communication system, scenarios, and nodes assumed in the following embodiments are the same as those in Embodiment 1. In Embodiment 2, a core network node (specifically, a NextGen Core in a 5G system) triggers modification to a mobility level, based on information sent from an upper layer or an operator.

Figure 5:
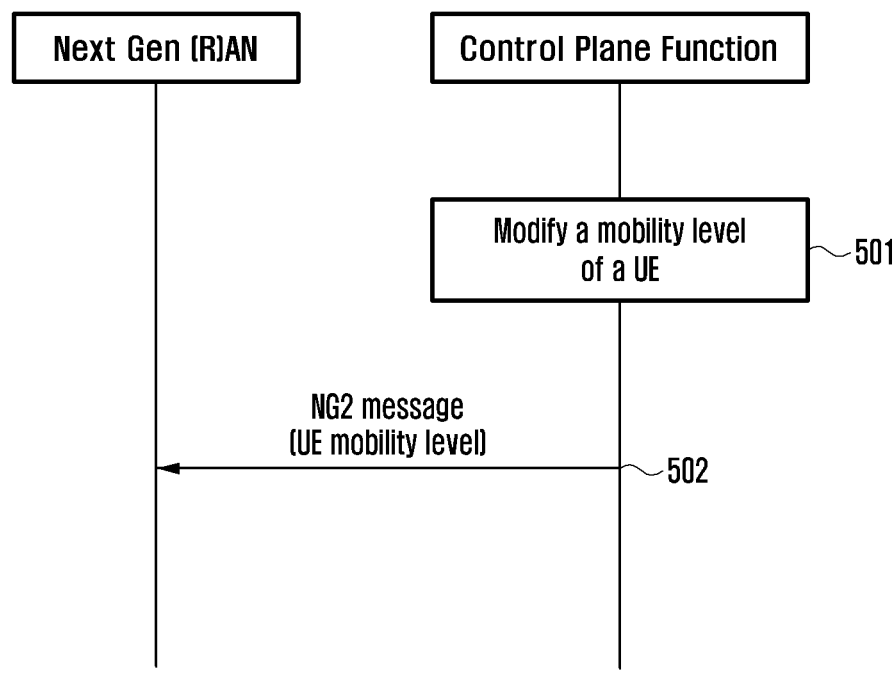
FIG. 5 is a schematic diagram of Embodiment 2 of the present disclosure.

Embodiment 2 of the present disclosure that supports handover and paging is described in FIG. 5. The method includes the steps of:

Step 502, a 5G core network control plane function entity decides to modify a mobility level of a UE.

An operator or a network may modify a mobility level assigned to the UE. The 5G core network control plane function entity decides to modify the mobility level of the UE according to a change of subscription information and the operator's policy. In other words, the NextGen Core may decide to modify mobility level information of the UE based on information sent from the higher layer or the operator.

Step 503, the 5G core network control plane function entity sends a NG2 message which contains updated mobility level information of the UE to a Next Gen(R)AN. Mobility level information of the UE is the same as that in step 301, and will not be described here. The Next Gen(R) AN performs update according to received mobility level information of the UE.

How the Next Gen(R)AN uses updated mobility level information of the UE is the same as that in step 302, and will not be described here.

At this point, the description of Embodiment 2 of the present disclosure is completed. By this method, mobility level information of the UE saved by the Next Gen(R)AN can be updated to prevent the Next Gen(R)AN from configuring unnecessary measurements of UEs, triggering unnecessary handover, and paging in some cells, and thus saves air interface resources, avoids unnecessary measurements and measurement reports of the UEs, and avoids power consumption.

In Embodiment 3, update of a mobility level is triggered by a service or a mobility demand of a UE. Update of the mobility level is carried out by a NextGen Core.

Figure 6:
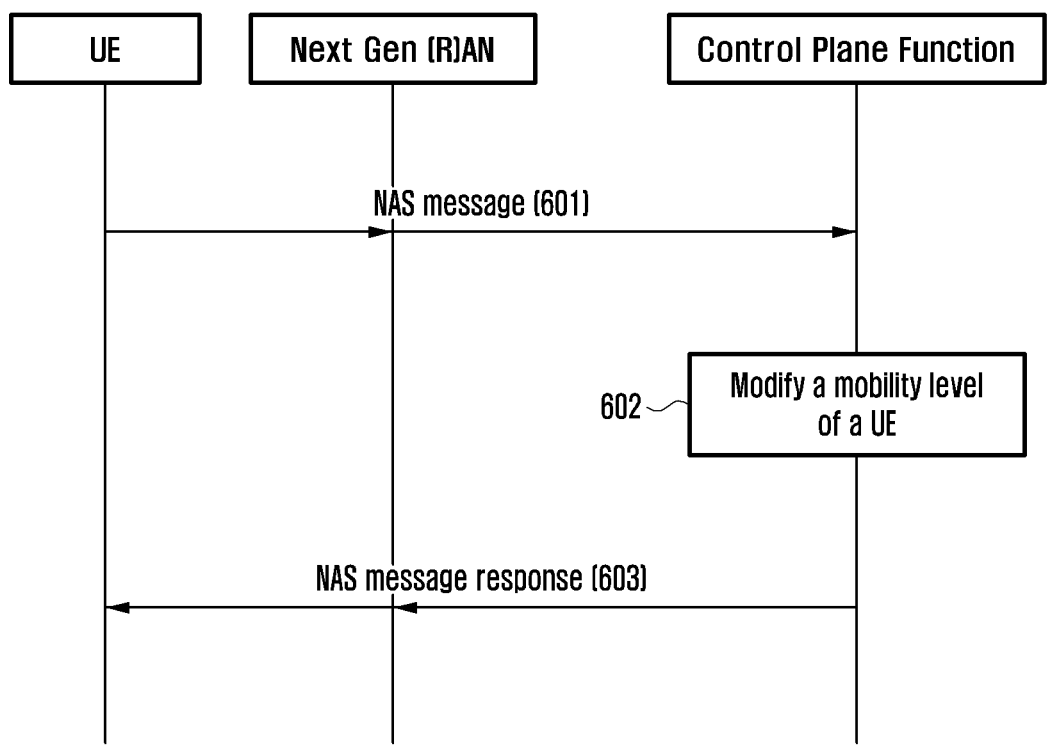
FIG. 6 is a schematic diagram of Embodiment 3 of the present disclosure.

Embodiment 3 of the present disclosure that supports handover and paging is described in FIG. 6. The method includes the steps of:

Step 601, a UE sends a non-access stratum message to a 5G core network control plane function entity via a Next Gen(R)AN.

The non-access stratum message includes a message for UE mobility management or session management, such as a TAU request, a service request, a packet data unit (PDU) session request, or an attach request. The non-access stratum message includes capability information of the UE, mobility demand information of the UE, service demand information of the UE, and/or the location information of the UE. The UE may provide additional service demands that need the network to support through the non-access stratum message. The UE may provide a mobility demand to the network through the non-access stratum message. The non-access stratum message may also contain capability information of the UE.

Step 602, the 5G core network control plane function entity decides to modify a mobility level of the UE.

An operator or a network may modify a mobility level assigned to the UE.

The 5G core network control plane function entity decides to modify the mobility level of the UE according to a change of subscription information, the operator's policy, and/or information obtained from the UE. Information obtained from the UE contains one or more pieces of information obtained from the UE in step 601.

Step 603, the 5G core network control plane function entity sends a non-access stratum message to Next Gen(R) AN through a NG2 message.

The non-access stratum message may be a service response, an attach response, or the like. NG2 refers to an interface between the 5G core network control plane function entity and the Next Gen(R)AN interface. Even if the interface will use a different name in the future, it will not affect the main content of the present disclosure. The NG2 message contains updated mobility level information of the UE. Mobility level information of the UE is the same as that in step 301, and will not be described here. The 5G core network control plane function entity may also send mobility level information of the UE and the non-access stratum message to the Next Gen(R)AN via different NG2 messages. The Next Gen(R)AN performs update according to received mobility level information of the UE.

How the Next Gen(R)AN uses updated mobility level information of the UE is the same as that in step 302, and will not be described here.

The Next Gen(R)AN sends a non-access stratum message to the UE via an air interface message.

At this point, the description of Embodiment 3 of the present disclosure is completed. By this method, mobility level information of the UE saved by the Next Gen(R)AN can be updated to prevent the Next Gen(R)AN from configuring unnecessary measurements of UEs, triggering unnecessary handover, and paging in some cells, and thus saves air interface resources, avoids unnecessary measurements and measurement reports of the UEs, and avoids power consumption.

In Embodiment 4, update to a mobility level by the NextGen Core is triggered by the UE handover between different cells or different NextGen(R)AN entities.

Figure 7:
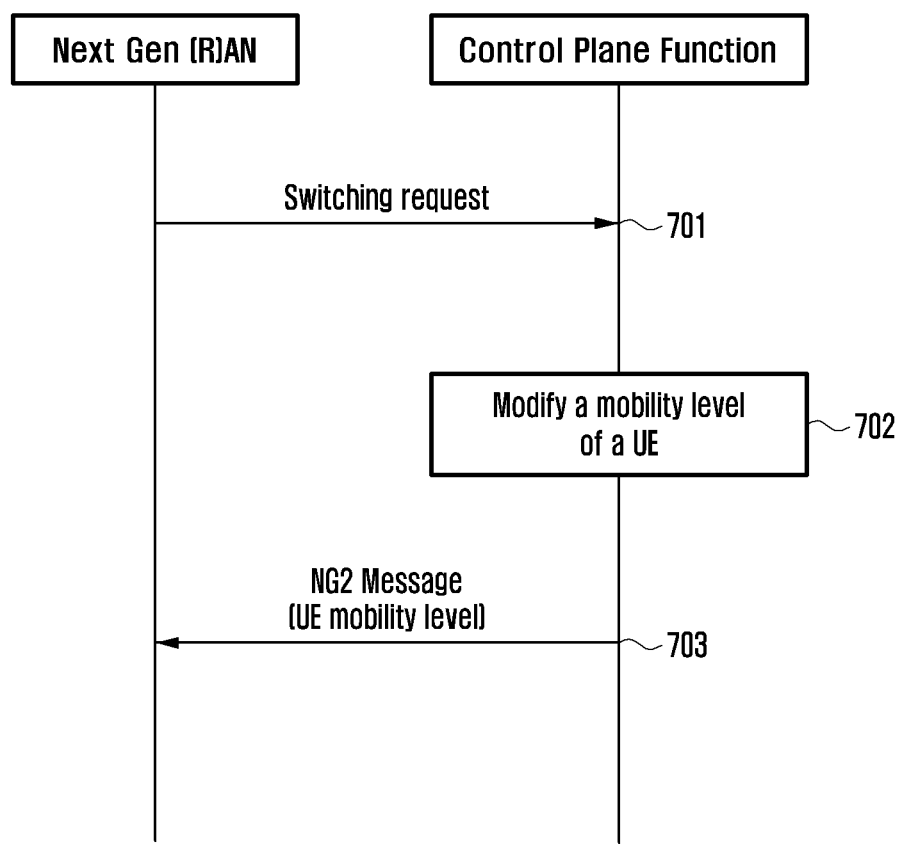
FIG. 7 is a schematic diagram of Embodiment 4 of the present disclosure.

Embodiment 4 of the present disclosure that supports handover and paging is described in FIG. 7. The present embodiment describes a method for updating a mobility level of a UE at a Next Gen(R)AN during a handover procedure. Detailed flows which are irrelevant to the present disclosure are omitted here. The method includes the steps of:

Step 701, a Next Gen(R)AN sends a switching request message to a 5G core network control plane function entity. The switching request message may be a handover required or a path switch request or a handover notification. The function of the switching request message is to inform the 5G core network control plane function entity that a UE has performed handover between different cells or different Next Gen(R)AN entities. The switching request message contains capability information of the UE, and/or location information of the UE.

Step 702, the 5G core network control plane function entity decides to modify a mobility level of a UE.

An operator or a network may modify a mobility level assigned to the UE.

The 5G core network control plane function entity decides to modify the mobility level of the UE according to a change of subscription information, the operator's policy, and/or information obtained from the UE or Next Gen(R)AN. Information obtained from the UE contains one or multiple information in step 401 or step 601. Information obtained from Next Gen(R)AN contains information of the UE obtained from the Next Gen(R)AN in step 701.

Step 703, the 5G core network control plane function entity sends mobility level information of the UE to the Next Gen(R)AN.

The message may be a handover request message, a path switch request acknowledgment message, a UE context modification message, etc. The NG2 message contains updated mobility level information of the UE. Mobility level information of the UE is the same as that in step 301. The Next Gen(R)AN performs update according to received mobility level information of the UE.

How the Next Gen(R)AN uses updated mobility level information of the UE is the same as that in step 302, and will not be described here.

At this point, the description of Embodiment 4 of the present disclosure is completed. By this method, mobility level information of the UE saved by the Next Gen(R)AN can be updated during a handover procedure, which prevents the Next Gen(R)AN from configuring unnecessary measurements of UEs, triggering unnecessary handover, and paging in some cells, and thus saves air interface resources, avoids unnecessary measurements and measurement reports of the UEs, and avoids power consumption.

Figure 8:
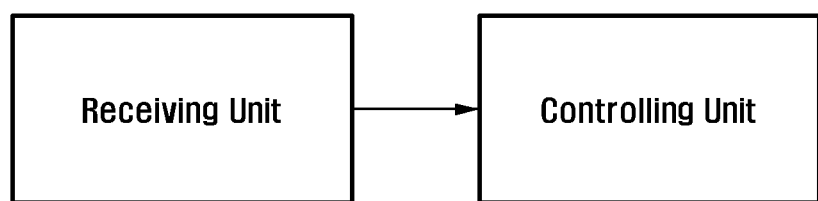
FIG. 8 is a schematic diagram of a basic structure of an apparatus for controlling or paging a UE according to the present disclosure

The above is detailed implementation of the methods for controlling and paging a UE in the present disclosure. The present disclosure further provides an apparatus for controlling or paging a UE to carry out the forgoing methods. The apparatus may be located in a node (e.g., a NextGen(R)AN of a 5G system). As shown in FIG. 8, a basic structure of the apparatus includes a receiving unit and a control unit.

The receiving unit is configured to receive mobility level information of a UE. The controlling unit is configured to perform handover control and/or measurement control and/or paging for the UE according to mobility level information of the UE.

A Long Term Evolution (LTE) base station can be connected, after being enhanced, to a 5G core network. Such an LTE base station capable of being connected to the core network is called an enhanced LTE base station. An ordinary LTE base station can be connected to an LTE core network node only, while an enhanced LTE base station can be connected to either an LTE core network node or a 5G core network node or the both. The LTE core network is called an Evolved Packet Core (EPC) network, and the 5G core network is called a New Generation Core (NGC) network. In the following description, the LTE base station refers to an ordinary base station which can be connected to an LTE core network only, and the enhanced LTE base station refers to an LTE base station which can be connected to the core network. The naming of the enhanced LTE base station is not limited thereto. In the present invention, an LTE base station named as an enhanced LTE base station particularly refers to an LTE base station which can be connected to a 5G core network, but this LTE base station still belongs to the radio access technology of the LTE and still adopts the LTE air interface technology for an air interface.

Embodiment 5

This embodiment of the present invention provides a method for selecting a core network for a UE by an enhanced LTE base station, comprising the following steps of:

establishing a RRC connection to a UE;

selecting a core network corresponding to the UE according to a preset condition;

receiving a response message transmitted by the corresponding core network; and transmitting a RRC configuration message to the UE to configure or reconfigure a user plane for the UE.

Figure 9:
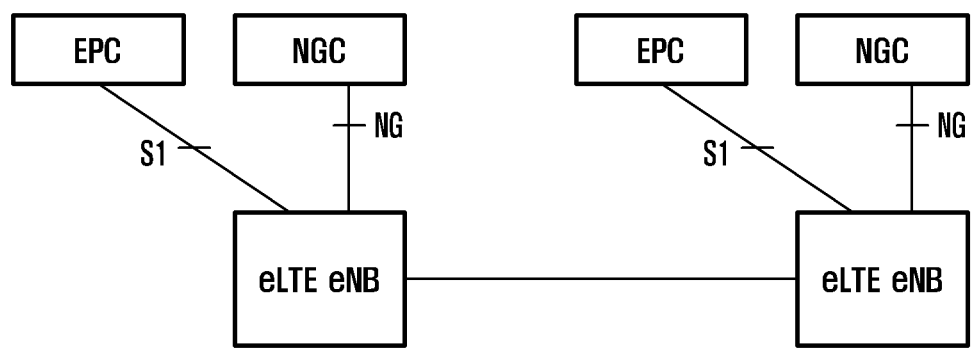
FIG. 9 is an architecture diagram of an enhanced LTE base station according to the present disclosure.

When the access network is an enhanced LTE base station, a terminal with the LTE access capability can access to this base station, and a terminal with the 5G capability can also access to this base station. The enhanced LTE base station selects a core network for the terminal As shown in FIG. 9, the enhanced LTE base station is connected to the EPC and the NGC. The principle of selecting a core network by the enhanced LTE base station can be one of the following principles.

1) A corresponding core network is selected according to the capability of the UE. The enhanced LTE base station knows, from a RRC (RRC) (i.e., a RRC message) transmitted by the terminal, the capability of the terminal, for example, the LTE capability or the 5G capability. The base station selects a core network for the terminal according to the capability of the terminal. If the terminal has the LTE capability, the base station selects the EPC as the core network for the terminal; however, if the terminal has the 5G capability, the base station selects the NGC as the core network for the terminal.

2) A core network is selected according to the capability of the UE and in combination with other information. The other information comprises, for example, load information of the core network, load information of the access network, strategy information preconfigured by the operator, or more. For a terminal with the LTE capability, the enhanced LTE base station can select only an LTE core network for the terminal; however, for a terminal with the 5G capability, the enhanced LTE base station can select an LTE core network or a core network for the terminal.

Figure 10:
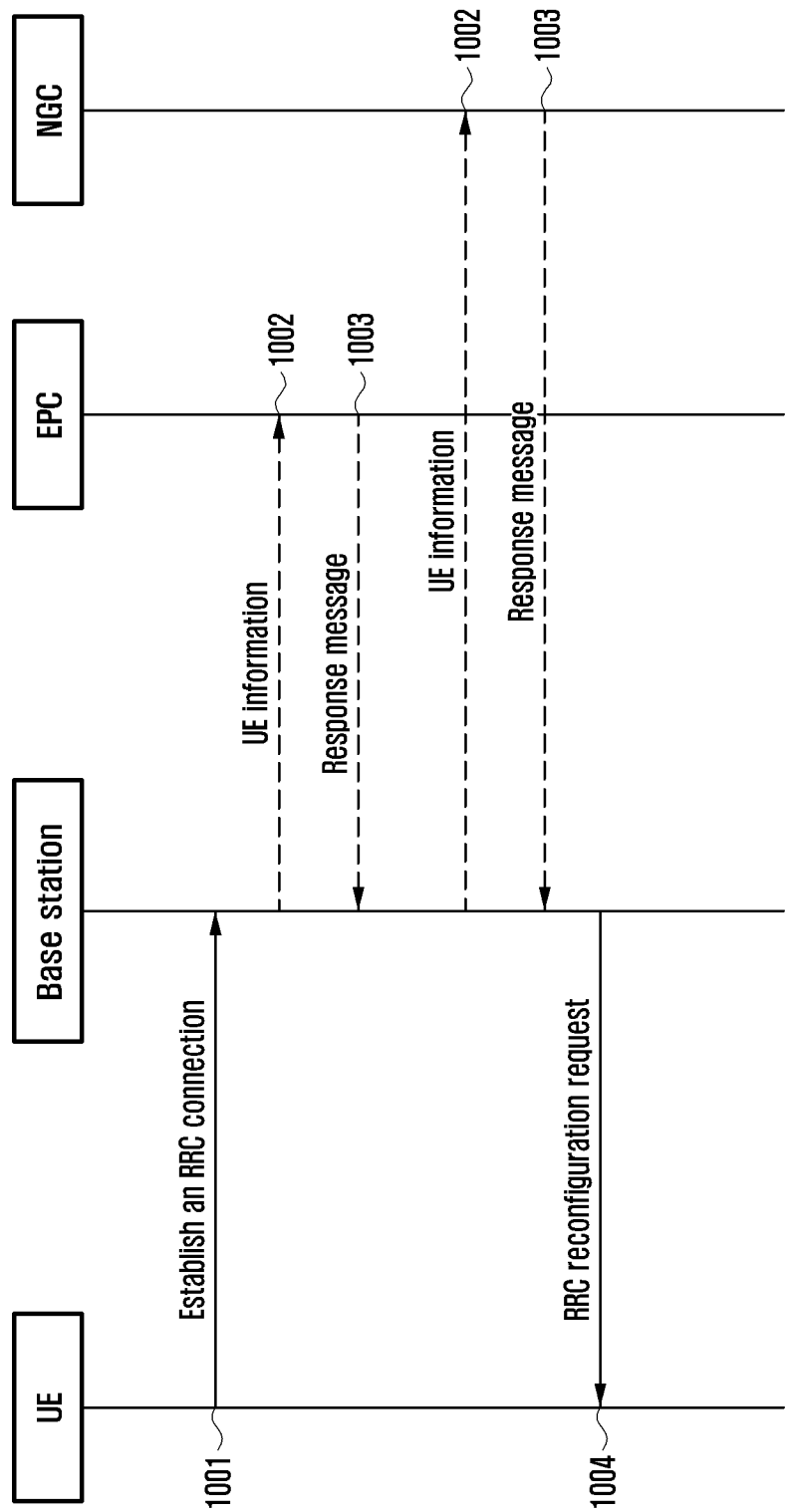
FIG. 10 is a schematic diagram of a process of selecting a core network for a UE according to the present disclosure.

Specifically, FIG. 10 depicts a process of selecting a core network for a UE.

1001: An RRC connection is established between a UE and an enhanced LTE base station. The capability of the UE is carried in an RRC message transmitted to the base station by the UE. The capability of the UE indicates whether the UE can access to the LTE, or whether the UE can access to the 5G, or whether the UE can access to either the 5G or the LTE.

1002: The enhanced LTE base station selects a corresponding core network according to the capability of the UE. In accordance with the principle described above, for example, a corresponding core network is selected according to the capability of the UE, or a core network is selected according to the capability of the UE and with reference to other information. After the core network is selected, the enhanced LTE base station transmits a message to the core network. The message can carry information about the UE or about a non-access stratum.

1003: The core network transmits a response message to the enhanced LTE base station. The core network authenticates the UE, allocates a user plane to the UE, and transmits a response message to the enhanced LTE base station.

1004: The enhanced LTE base station transmits an RRC configuration message to the UE. The enhanced LTE base station configures or reconfigures a user plane for the UE.

Embodiment 6

A horizontal interface is to be established between an enhanced LTE base station and a neighboring base station.

The type of the established interface is different according to different types of neighboring base stations. There may be three types of neighboring base stations.

If the neighboring base station is an ordinary LTE base station, an X2 interface is established between the enhanced LTE base station and the LTE base station. The X2 interface is a present horizontal interface between an LTE base station and another LTE base station.

If the neighboring base station is an enhanced LTE base station, in order to support both LTE users and 5G users, one method is to establish two horizontal interfaces, one of which is an X2 interface which has been defined at present. This interface can be enhanced according to new features, and this interface can transmit information for LTE users. The other interface is a new horizontal interface defined in 5G, called Xn interface. The Xn interface is a new horizontal interface defined for the new 5G features, and used for transmitting a signaling for 5G users. This interface cannot be used for transmitting a signaling for LTE users, because some features of the LTE are quite different from those of the 5G. An interface defined for 5G features is unable to support the transmission of information by LTE users. Another method is to establish one horizontal interface. This interface can transmit both a signaling for LTE users and a signaling for 5G users.

If the neighboring base station is a 5G base station, the horizontal interface between the enhanced LTE base station and the 5G base station transmits only the signaling for 5G users. Therefore, the horizontal interface is a new horizontal interface Xn defined for 5G. But this horizontal interface can also be other interfaces, for example, an Xx interface as described in the following embodiments. By taking an X2 interface as example, this embodiment of the present invention provides a method for establishing a secondary base station for a UE by an enhanced LTE base station, comprising the following steps of:

transmitting a secondary base station addition request message to a secondary base station with an X2 interface;

receiving a secondary base station addition response message transmitted by the secondary base station with the X2 interface, where, the secondary base station addition response message carrying configuration information for a UE provided by the secondary base station;

transmitting, to the UE, a RRC message carrying configuration information for the UE provided by the secondary base station with the X2 interface;

receiving the RRC message transmitted by the UE after new configuration information is successfully configured; and transmitting a response message to the secondary base station with the X2 interface.

Figure 11:
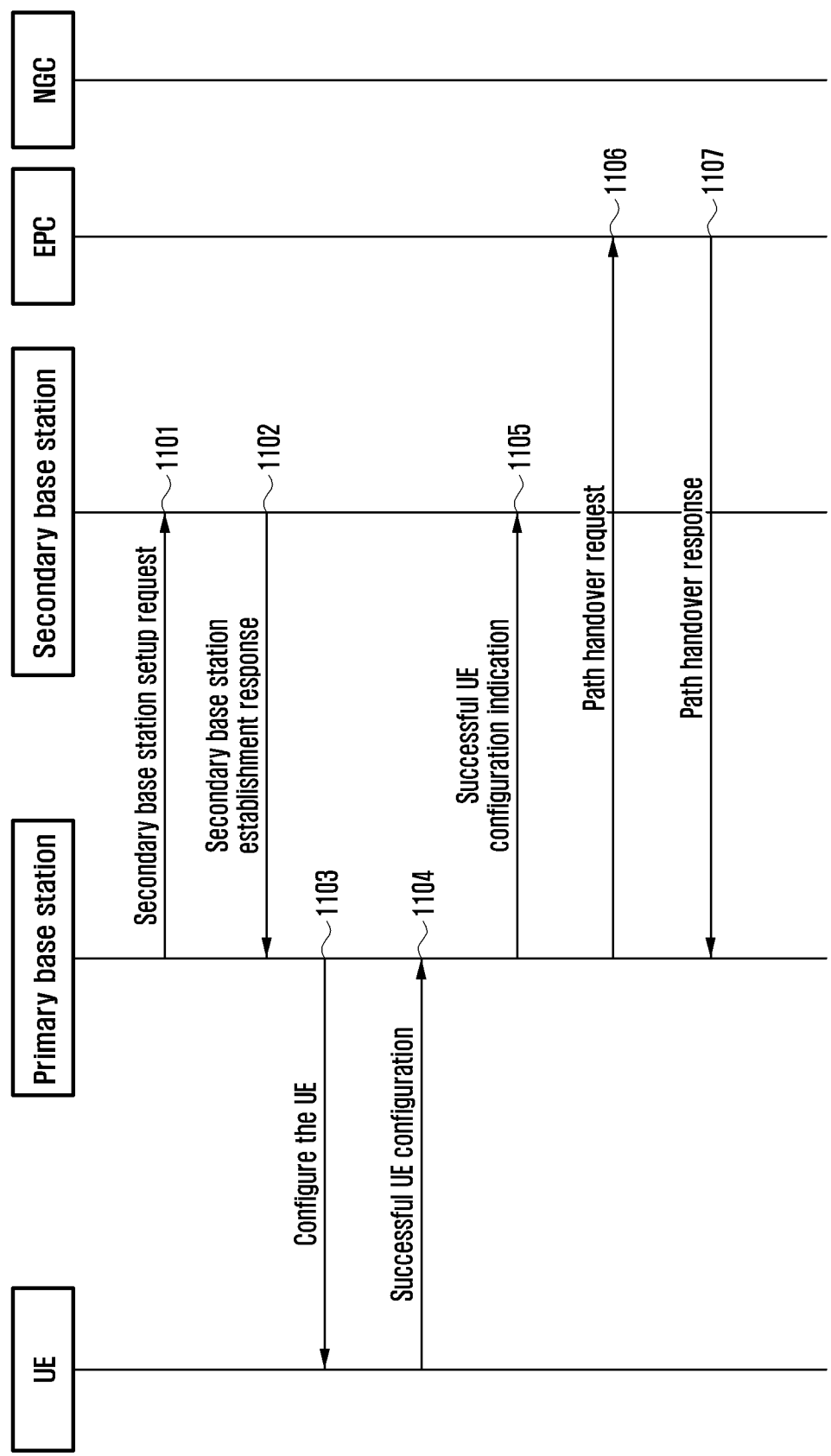
FIG. 11 is a schematic diagram of a process of establishing a secondary base station for a UE based on an X2 interface according to the present disclosure.

Further, during establishment of a secondary base station for the UE, when a serving base station transmits a message to establish a secondary bearer, the transmitted secondary cell establishment or modification message is different according to different secondary base stations. FIG. 11 depicts a process of establishing a secondary base station for a UE based on an X2 interface.

Step 1101: A primary base station transmits a secondary base station addition request message to a secondary base station.

The primary base station is an enhanced LTE base station. The primary base station decides, according to a measurement report for the UE or the measurement of uplink signals of the UE, to establish a secondary based station for the UE, and transmits the data from the UE by a secondary bearer. If the secondary base station is an ordinary LTE base station, the primary base station transmits the secondary base station addition request message.

If the secondary base station is an enhanced LTE base station, two horizontal interfaces, i.e., X2 and Xn, are established between the primary base station and the secondary base station, and the primary base station selects a corresponding horizontal interface according to the capability of the UE. For example, if the UE is an LTE terminal, the primary base station selects the X2 interface and transmits a handover request message. If the UE is a 5G terminal, the primary base station selects the Xn to transmit the secondary base station addition request message. Or, the primary base station selects, according to the core network selected for the UE, a horizontal interface for transmitting messages. For example, if the primary base station selects the EPC for the UE, there is an S1 interface between the primary base station and the EPC, and the primary base station selects the X2 to transmit messages from the UE. If the primary base station selects the NGC for the UE, there is an NG interface between the primary base station and the NGC, and the primary base station selects the Xn to transmit messages from the UE. Subsequently, the primary base station transmits the secondary base station addition request to the secondary base station.

If the secondary base station is an enhanced LTE base station, a horizontal interface is established between the primary base station and the secondary base station, and the primary base station transmits the secondary base station addition request message to the secondary base station. The secondary base station is also connected to two core networks, i.e., EPC and NGC. A user plane protocol stack also contains an LTE user plane protocol stack and a 5G user plane protocol stack. The secondary base station needs to select a protocol structure to serve users. The selected protocol structure should be consistent with the selection of the primary base station, or should refer to the core network selected by the primary base station. Since the primary base station has selected and established a user plane for the UE and has selected a core network node, the primary base station needs to inform the secondary base station of which protocol is used to establish a secondary bearer for the UE. The secondary base station addition request message contains the type of the core network selected for the UE by the primary base station, or the type of a backhaul selected for the UE by the primary base station, or indication information indicating that the secondary base station needs to use which protocol stack to serve the UE, or the capability information of the UE. The secondary base station establishes a secondary bearer, i.e., selects a corresponding user plane protocol stack, according to the capability information of the UE.

Step 1102: The secondary base station transmits a secondary base station addition response message to the primary base station. This message contains configuration information for the UE provided by the secondary base station.

Step 1103: The primary base station transmits an RRC message to the UE. This message carries configuration information for the UE provided by the secondary base station.

Step 1104: The UE transmits the RRC message to the primary base station. After successfully configuring new configuration information, the UE transmits a response message to the primary base station.

Step 1105: The primary base station transmits a response message to the secondary base station.

Step 1106: If necessary, the primary base station transmits a message to a core network to configure a user plane from the core network to the secondary base station.

Step 1107: The core network transmits a response message to the primary base station.

Embodiment 7

Further, when the interface is an interface other than the X2 interface, for example, the connection between an enhanced LTE base station (or an LTE base station) and a 5G base station is an Xx interface. The Xx interface is different from the previous X2 interface. The existing X2 interface is an interface connecting two eNBs, and base stations on the opposite sides belong to the LTE and are in a same access network mode. However, one of two base stations connected by the Xx interface belongs to the LTE while the other one belongs to the 5G, and the two base stations are in different access network modes. As a result, the process at the Xx is different from the process at the existing X2. The Xx interface can be a same type of interface as the interface (Xn) between 5G base stations, or an enhanced interface of the existing X2 interface, or a new interface defined between an LTE base station and a 5G base station.

Figure 12:
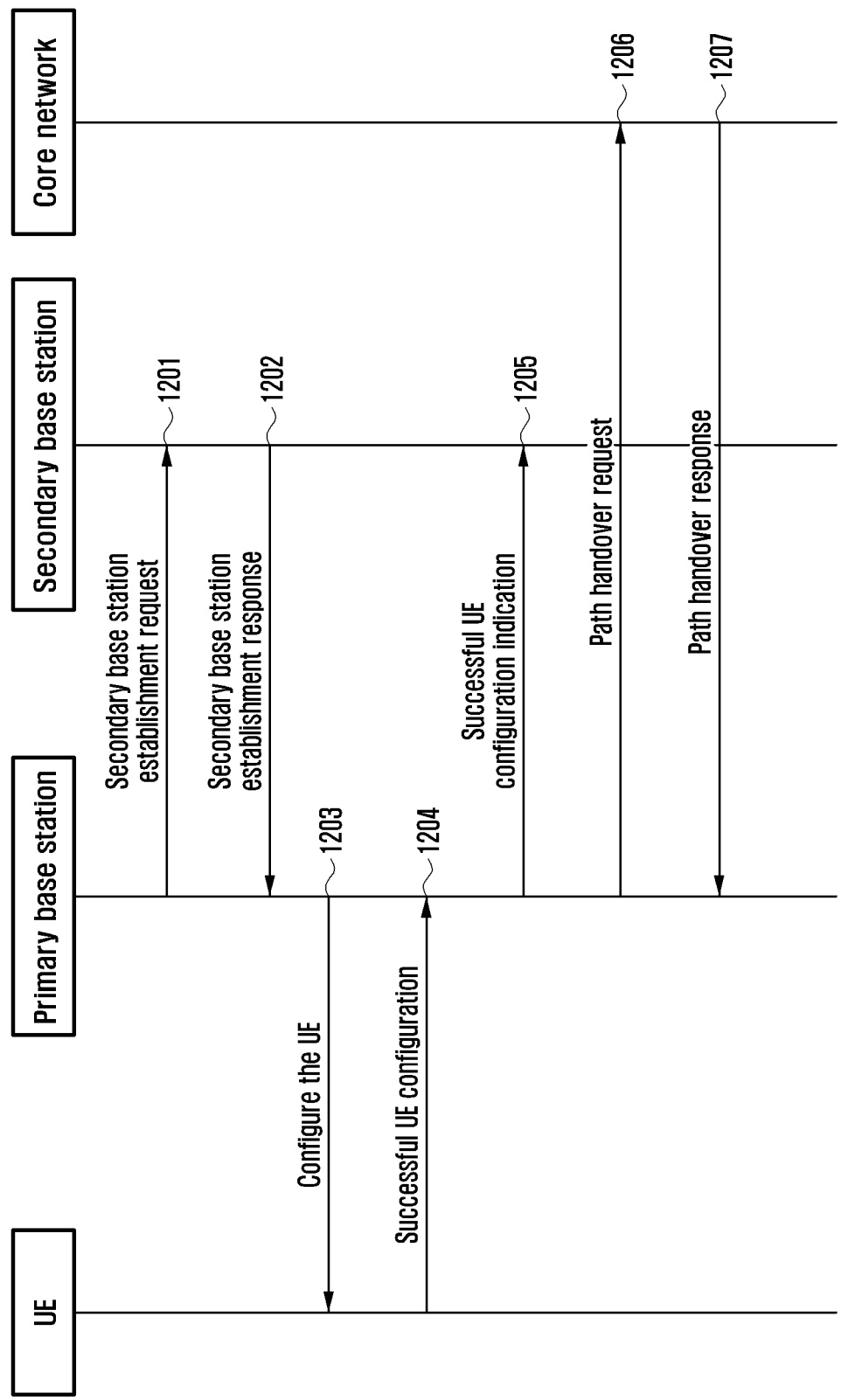
FIG. 12 is a schematic diagram of a process of establishing an X2 horizontal interface between an enhanced LTE base station and a neighboring base station according to the present disclosure.

An enhanced LTE base station (or an LTE base station) and a 5G base station can be configured to be in dual connectivity, with one base station being a primary base station while the other base station being a secondary base station. In a case, the primary base station is an enhanced LTE base station (or an LTE base station), the secondary base station is a 5G base station, the enhanced LTE base station is connected to the NGC, and the LTE base station is connected to the EPC. In another case, the primary base station is a 5G base station, the secondary base station is an enhanced LTE base station, and the 5G base station is connected to the NGC. FIG. 12 depicts a process of establishing a secondary base station for a UE based on an Xx interface.

Step 1201: A primary base station transmits a secondary base station addition request message to a secondary base station.

The current secondary base station request message of the X2 interface contains a container from the primary base station to the secondary base station, and the container contains RRC configuration information. After the secondary base station receives the secondary base station addition request message, a bearer on the secondary base station is configured according to the RRC configuration information transmitted on the primary base station. At the Xx interface, since the primary base station (or the secondary base station) can be either an LTE base station or a 5G base station, two RRC containers from the primary base station to the secondary base station need to be defined in the secondary base station addition request message. One RRC container is a container in a 5G RRC format, while the other RRC container is a container in an LTE RRC format.

When transmitting this message, the primary base station can select a proper RRC container according to the different types of the primary base stations in a destination-adapting to-source manner. For example, if the primary base station is a 5G base station, the primary base station selects the container in the 5G RRC format. For example, if the primary base station is an LTE base station, the primary base station selects the container in the LTE RRC format.

Or, the primary base station selects a proper RRC container according to the type of the secondary base station in a source-adapting to-destination manner For example, if the secondary base station is a 5G base station, the primary base station selects the container in the 5G RRC format. For example, if the secondary base station is an LTE base station, the primary base station selects the container in the LTE RRC format.

Step 1202: The secondary base station transmits a secondary base station addition response message to the primary base station.

The current secondary base station addition response message of the X2 contains a container from the secondary base station to the primary base station, and the container carriers the RRC message to be transmitted to the UE. At the Xx interface, two RRC containers of different types also need to be defined in the secondary base station addition response message. One RRC container is a container in a 5G RRC format, while the other RRC container is a container in an LTE RRC format. Unlike the step 1201, the RRC container transmitted by the secondary base station is RRC configuration information to be transmitted to the UE and is not to be parsed by the primary base station. Therefore, instead of adapting to the type of the primary base station, the UE is configured according to the type of the secondary base station. For example, if the secondary base station is a 5G base station, the container in the 5G RRC format is contained in the response message; however, if the secondary base station is an LTE base station, the container in the LTE RRC format is contained in the response message.

Step 1203: The primary base station transmits an RRC message to the UE. This message carries configuration information for the UE provided by the secondary base station.

Step 1204: The UE transmits the RRC message to the primary base station. After successfully configuring new configuration information, the UE transmits a response message to the primary base station.

Step 1205: The primary base station transmits a response message to the secondary base station.

Step 1206: If necessary, the primary base station transmits a message to a core network to configure a user plane from the core network to the secondary base station.

Step 1207: The core network transmits a response message to the primary base station.

Embodiment 8

The above method is applicable to an Xx handover process. An Xx handover request message contains RRC context information. At present, this information contains a handover preparation message defined by an LTE RRC protocol layer. In the Xx handover request, RRC context information of two formats needs to be defined. One format is RRC context information defined by an LTE RRC protocol layer, while the other format is RRC context information defined by a 5G RRC protocol layer. When transmitting this message, a source base station can select proper RRC context information according to the different types of the source base stations in a destination-to-source manner For example, if the source base station is a 5G base station, the RRC context information in the 5G format is selected. For example, if the source base station is an LTE base station, the RRC context information in the LTE format is selected.

Or, the source base station selects a proper RRC transparent container according to the different types of destination base stations in a source-adapting to-destination manner For example, if the destination base station is a 5G base station, the RRC context information in the 5G format is selected. For example, if the destination base station is an LTE base station, the RRC context information in the LTE format is selected.

An Xx handover response message contains an RRC transparent container from the destination base station to the source base station, and the transparent container carriers a handover command message to be transmitted to a UE. The RRC transparent container is defined in two formats. One format is a handover command defined by the LTE RRC protocol layer, while the other format is a handover command defined by the 5G RRC protocol layer. The destination base station selects an RRC transparent container in a corresponding format according to the own type of the destination base station. For example, if the destination base station is an enhanced LTE base station, the RRC transparent container defined by the LTE RRC protocol is contained; however, if the destination base station is a 5G base station, the RRC transparent container defined by the 5G RRC protocol is contained.

Embodiment 9

If two horizontal interfaces are to be established between the enhanced LTE base stations, it is necessary to study how to establish the two horizontal interfaces. At present, there is only one horizontal interface between the two nodes. In some cases, for example, if the two nodes are enhanced LTE base stations, it is required to establish two horizontal interfaces between the two nodes. If it is required to establish two horizontal interfaces, an enhanced LTE base station needs to know in advance that a neighboring base station is an enhanced LTE base station, so that the two interfaces can be established with this base station.

Based on this, this embodiment of the present invention provides a method for establishing a horizontal interface between an enhanced LTE base station and a neighboring base station, comprising the following steps of:

transmitting an X2 interface or non-X2 interface establishment request message, the X2 interface or non-X2 interface establishment request message containing an identifier of an enhanced LTE base station and information about cells in the enhanced LTE base station; and receiving an X2 interface or non-X2 interface establishment response message transmitted by a neighboring base station, the X2 interface or non-X2 interface establishment response message containing an identifier of the neighboring base station and information about cells in the neighboring base station.

Figure 13:
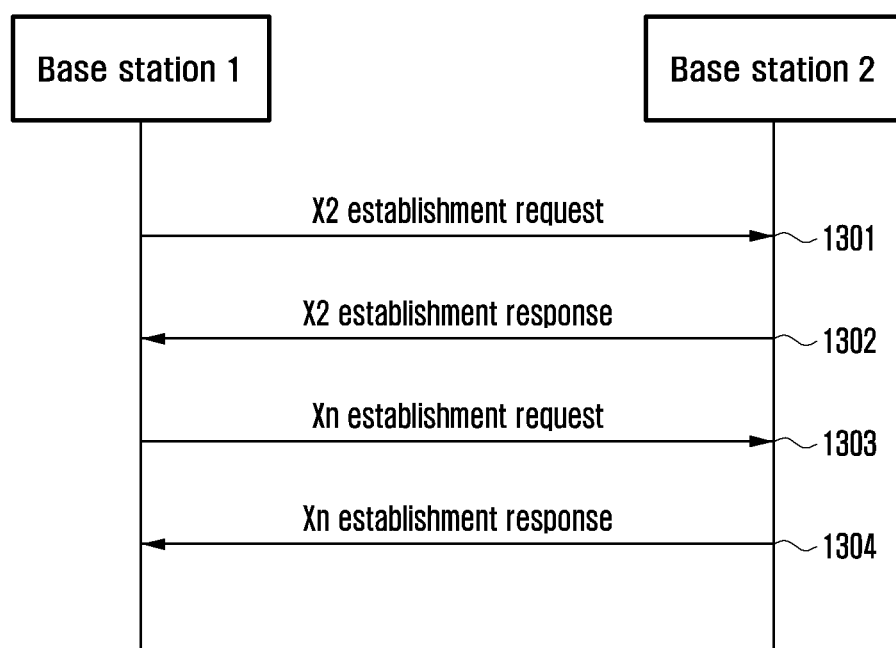
FIG. 13 is a schematic diagram of a process of informing a UE of configuring a corresponding protocol according to the present disclosure.

Specifically, as shown in FIG. 13, if it is assumed that the two horizontal interfaces are X2 and Xn, the method for establishing horizontal interfaces can be one of the following methods.

Method 1: The enhanced LTE base station pre-configures the type of the neighboring base station. The type of the neighboring base station is preconfigured by operation maintenance. The type of the neighboring base station can be an LTE base station, an enhanced LTE base station or a 5G base station. The type of the base station can also be decided by the classification of some frequencies or the classification of physical layer identification codes. According to the type of the base station, a corresponding horizontal interface is established between the enhanced LTE base station and the neighboring base station.

Figure 15:
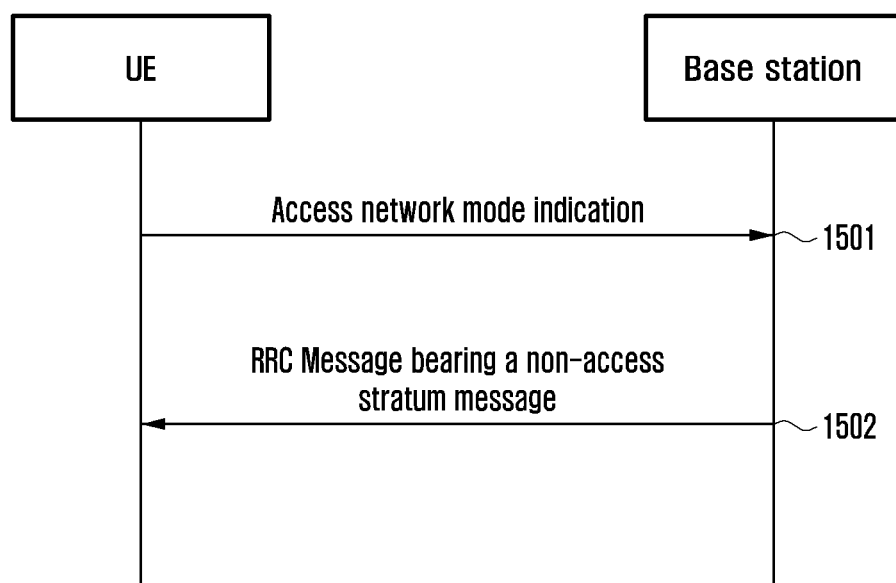
FIG. 15 is a schematic diagram of a process of establishing a secondary base station for a UE based on an Xx interface according to the present disclosure.

Or according to the method described in FIG. 15, access network informs a terminal that an access network can provide new 5G features, i.e., an access network which is able to be connected to a 5G core network. For example, the air interface for eLTE eNB is LTE access, from air interface cannot deduce whether the eLTE is connecting to 5GC, and using 5G service accordingly. So eLTE eNB broadcasts a notification that 5G feature is supported or not, that is whether eLTE eNB is connecting to 5G core network. When performing automatic neighboring relationship procedure, the UE receives the broadcasting information from the neighboring eNB and report such notification, i.e. that eNB supporting 5G feature, to the serving eNB. the serving eNB is the eNB1 in this Embodiment, according to the measurement report, the eNB1 knows the neighboring eNB is an eLTE eNB, if the eNB1 is also an eLTE eNB, the eNB 1 should establish both X2 and Xn.

Step 1301: A base station 1 transmits an X2 establishment request message, the X2 establishment request message containing an identifier of the base station and information about cells of the base station.

Step 1302: A base station 2 transmits an X2 establishment response message. The X2 establishment response message contains an identifier of the base station and information about cells of the base station.

Step 1303: The base station 1 transmits an Xn establishment request message. According to the configuration information, the base station 1 initiates an Xn establishment process. This process and the process in the step 1301 can be combined into one process. The Xn establishment response message contains the identifier of the base station and information about cells of the base station. The information about cells of the base station contains the frequency of the cells.

Step 1304: The base station 2 transmits an Xn establishment response message. The step 1304 and the step 1302 can be combined into one process. The Xn establishment response message contains the identifier of the base station and information about cells of the base station. The information about cells of the base station contains the frequency of the cells.

Method 2: When an enhanced LTE base station (i.e., a base station 1) transmits an X2 interface establishment request message, the base station 1 establishes the X2 interface normally. The X2 interface establishment request message carries an indication for indicating whether the base station has the capability of establishing an Xn interface. When a base station 2 transmits an X2 interface establishment response message, the X2 interface establishment response message can also carry indication information for indicating whether the base station has the capability of establishing an Xn interface. If both the base station 1 and the base station 2 have the capability of establishing an Xn interface, the base station 1 or the base station 2 transmits an Xn establishment request message to the opposite base station.

Step 1301: A base station 1 transmits an X2 establishment request message, the X2 establishment request message containing an identifier of the base station and information about cells of the base station. The X2 request message further contains indication information about whether a cell/base station supports 5G features or supports an Xn interface.

Step 1302: A base station 2 transmits an X2 establishment response message. The X2 establishment response message contains an identifier of the base station and information about cells of the base station. The X2 response message further contains indication information about whether a cell/base station supports 5G features or supports an Xn interface.

Step 1303: The base station 1 transmits an Xn establishment request message. According to the messages in the steps 1301 and 1302, if both the base station 1 and the base station 2 support the 5G features or support the establishment of an Xn interface, the base station 1 initiates an Xn establishment process. The Xn establishment request message contains the identifier of the base station and information about cells of the base station. The information about cells of the base station contains the frequency of the cells.

Step 1304: The base station 2 transmits an Xn establishment response message. The Xn establishment response message contains the identifier of the base station and information about cells of the base station. The information about cells of the base station contains the frequency of the cells.

Method 3: An enhanced LTE base station (i.e., a base station 1) transmits an Xn establishment request message; and, if an opposite base station (i.e., a base station 2) has the capability of establishing an Xn interface, for example, if the base station 2 is an enhanced LTE base station or a 5G base station, the base station 2 transmits an Xn establishment response message. If the base station 2 does not have the capability of establishing an Xn interface, for example, if the base station 2 is an ordinary LTE base station, the base station 2 does not transmit a response message or transmits a failure message. If the base station 1 receives the response message, it is considered that the Xn is established successfully; however, if the base station 1 does not receive the response message or receives the failure message, it can be considered that the Xn interface cannot be established between the base station 1 and the base station 2.

The X2 interface can be established in a similar way. In other words, the base station 1 transmits an X2 establishment request message; if the opposite base station (i.e., the base station 2) has the capability of establishing an X2 interface, for example, if the base station 2 is an ordinary LTE base station or an enhanced LTE base station, the base station 2 transmits an X2 establishment response message. If the base station 2 does not have the capability of establishing an X2 interface, for example, if the base station 2 is an ordinary 5G base station, the base station 2 does not transmit a response message or transmits a failure message. If the base station 1 does not receive the response message or receives the failure message, it can be considered that the X2 interface cannot be established between the base station 1 and the base station 2.

Step 1301: A base station 1 transmits an X2 establishment request message, the X2 establishment request message containing an identifier of the base station and information about cells of the base station.

Step 1302: A base station 2 transmits an X2 establishment response message. The X2 establishment response message contains an identifier of the base station and information about cells of the base station.

Step 1303: The base station 1 transmits an Xn establishment request message. The Xn establishment response message contains the identifier of the base station and information about cells of the base station. The information about cells of the base station contains the frequency of the cells.

Step 1304: If the base station 2 can identify the message in the step 1303, the Xn interface can be established, and the base station 2 transmits an Xn establishment response message. The Xn establishment response message contains the identifier of the base station and information about cells of the base station. The information about cells of the base station contains the frequency of the cells. Otherwise, the base station does not transmit a response message or transmits an error message to the base station 1. The Xn interface between the base station 1 and the base station 2 fails to be established.

Embodiment 10

Figure 14:
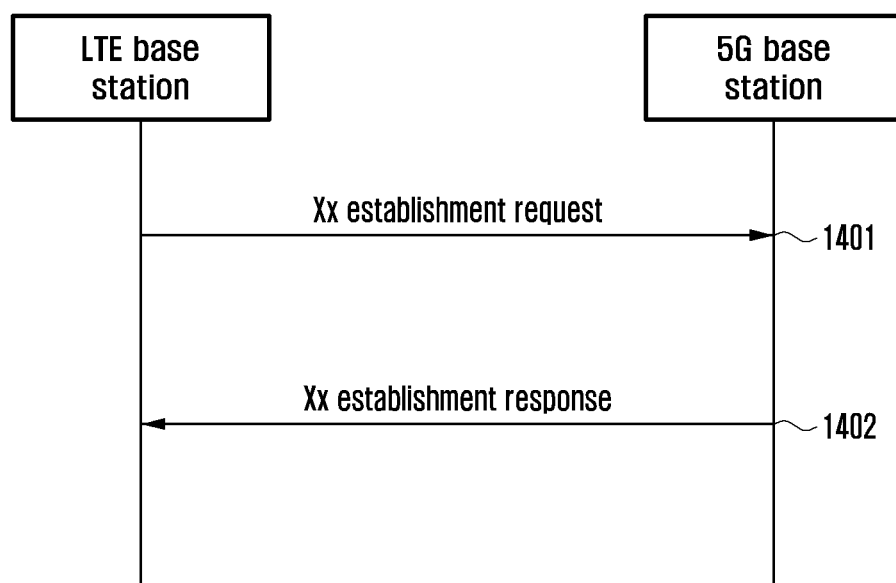
FIG. 14 is a schematic diagram of a process of establishing an Xx horizontal interface between an enhanced LTE base station and a neighboring base station according to the present disclosure.

Of course, the Xn can also be other interfaces, for example, an Xx interface as described in this embodiment. As shown in FIG. 14, it is assumed that the horizontal interface is an Xx interface, and the process of establishing a horizontal interface is as follows.

1401: In the process of establishing an Xx interface, a base station 1 transmits an Xx establishment request message. The message contains information about a serving cell in the base station 1. If the base station 1 belongs to the LTE, the information about a serving cell is information about an LTE cell; however, if the base station 1 belongs to the 5G, the base station establishment request message contains information about a 5G cell. If the information about the 5G cell is similar to the information about the LTE cell, the information about cells can be transmitted by a same information element (IE, for short). If the information about the 5G cell is different from the information about the LTE cell, the information about cells needs to be transmitted by different IEs. In other words, the Xx establishment request message contains an IE for the LTE cell and an IE for the 5G cell. The base station sets a corresponding IE according to different types of the base stations transmitting the message.

1402: Similarly, in an Xx establishment response message, the information about cells is transmitted by different IEs. In other words, the Xx establishment response message contains an IE for the LTE cell and an IE for the 5G cell. The base station sets a corresponding IE according to different types of the base stations transmitting the response message.

Embodiment 11

In order to perform smooth evolution from the existing LTE network to the 5G network, a 5G terminal must access to the 5G and also to the enhanced LTE access network. It means that the 5G terminal must support not only LTE protocols including an access stratum protocol and a non-access stratum protocol, but also 5G protocols including an access stratum protocol and a non-access stratum protocol. The access stratum protocol is a signaling protocol transparently transmitted to a core network by a UE via an access network. When the access network is a 5G access network, the 5G terminal can use new 5G features and thus use the 5G protocols. If the access network is an LTE access network, the LTE access network may define two types. One type is an enhanced LTE access network which is able to be connected to a 5G core network, so that the new 5G features can be used. The other type is an LTE access network which is able to be connected to the EPC only, but not to the 5G core network, so that the LTE terminal cannot use the new 5G features. Therefore, when the terminal is in the LTE access network, the terminal will perform different operations according to the different type of the LTE access network.

Based on this, this embodiment of the present invention provides a method for informing a UE about how to configure protocol by an enhanced LTE base station, comprising the following steps of:

transmitting, to a UE, a notification message that the access network of the UE can provide 5G features; and
receiving a RRC message transmitted by the UE, and acquiring a non-access stratum message carried by the RRC message so that the UE configures a protocol matched with the access network of the UE.

Specifically, FIG. 15 depicts a process of informing a UE of using which protocol to access to the network.

1501: A network informs a terminal that an access network can provide new 5G features. When the access network is an LTE access network, the network informs the terminal that the access network is an enhanced LTE access network or an ordinary LTE access network. The informing can be done by ways of a cell broadcast or a dedicated signaling. The informing by ways of a broadcast can be as follows: carrying indication information in a broadcast message to indicate whether the access network has the capability of providing new 5G features. If the access network has the capability of providing new 5G features, the terminal can configure a 5G non-access stratum message, and transmits the RRC message carrying the non-access stratum message to a 5G core network. If the access network does not have the capability of providing new 5G features, the terminal configures a 4G access stratum message, and transmits the RRC message carrying the non-access layer message to a 4G core network.

The informing by a dedicated signaling is as follows: carrying indication information in a dedicated signaling transmitted to the terminal, to indicate whether the access network has the capability of providing new 5G features. For example, the UE transmits an RRC establishment request message to the access network, where the message carries the capability information of the UE. Upon receiving the RRC establishment request message, the access network selects a proper core network for the terminal according to the capability of the UE. Then, the access network transmits a radio establishment message carrying indication information for indicating the access network selects an EPC or a NGC for the terminal, that is, whether the terminal can use a 5G non-access stratum signaling to transmit a 5G non-access stratum message to the core network.

Or, the UE transmits an RRC establishment request message to the access network, where this message carries the cause of RRC establishment and the identifier of the UE. Upon receiving the RRC establishment request message, the access network transmits a radio establishment message to the UE, where this message carries indication information for indicating whether the access network is connected to the NGC, that is, whether the terminal can use a 5G non-access stratum signaling to transmit a 5G non-access stratum message to the core network.

1502: The UE transmits an RRC message to the access network, the RRC message carrying a non-access stratum message. According to the indication information in the step 1501, the UE configures a corresponding non-access stratum message. If the indication information indicates that the access network has the capability of providing new 5G features, that is, the access network is an enhanced LTE access network, the access network selects a core network for the terminal or the access network is connected to a core network, and the terminal configures a 5G non-access stratum signaling and then transmits the 5G non-access stratum signaling to the core network via the access network. If the indication information indicates that the access network does not have the capability of providing new 5G features but has the capability of providing 4G features only, or if the access network selects a 4G core network for the terminal, the terminal configures a 4G non-access stratum signaling and transmits the 4G non-access stratum signaling to the 4G core network via the access network.

Embodiment 12

Figure 16:
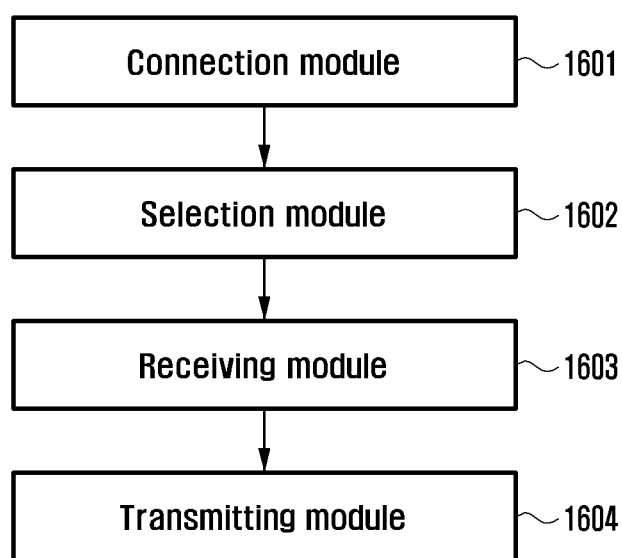
FIG. 16 is a schematic structure diagram of a device for selecting a core network for a UE by an enhanced LTE base station according to an embodiment of the present disclosure.

Referring to FIG. 16, based on the method for accessing to a core network by an enhanced LTE base station provided in Embodiment 5, Embodiment 12 of the present invention provides a device for selecting a core network for a UE by an enhanced LTE base station. The device comprises a connection module 1601, a selection module 1602, a receiving module 1603 and a transmitting module 1604, wherein:

the connection module is configured to establish a RRC connection to a UE; the selection module is configured to select a core network corresponding to the UE according to a preset principle; the receiving module is configured to receive a response message transmitted by the corresponding core network; and, the transmitting module is configured to transmit a RRC configuration message to the UE to configure or reconfigure a user plane for the UE.

In the solutions of the present invention, the specific function implementations of the modules in the device for accessing to a core network by an enhanced LTE base station provided in Embodiment 12 can refer to the specific steps of the method for accessing to a core network by an enhanced LTE base station provided in Embodiment 5, and will not be repeated here.

Embodiment 13

Figure 17:
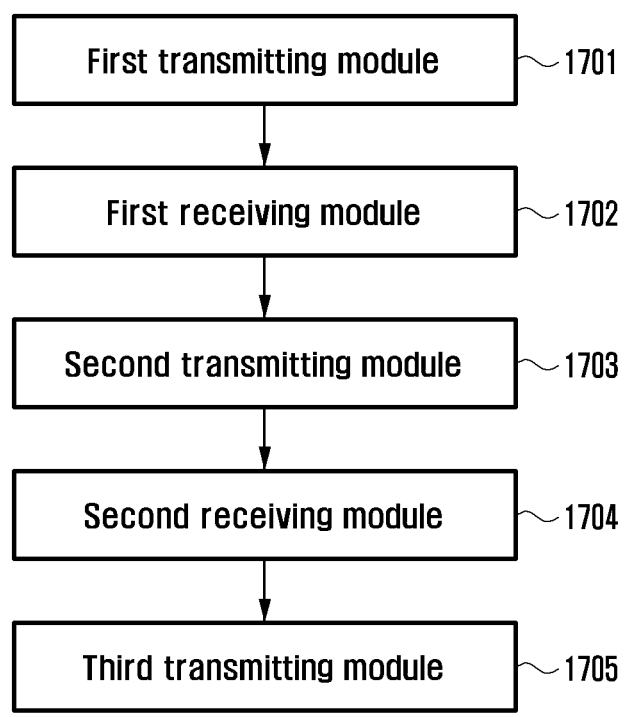
FIG. 17 is a schematic structure diagram of a device for establishing a secondary base station for a UE by an enhanced LTE base station according to an embodiment of the present disclosure.

Referring to FIG. 17, based on the method for establishing a secondary base station for a UE by an enhanced LTE base station provided in Embodiments 6, 7 and 8, Embodiment 13 of the present invention provides a device for establishing a secondary base station for a UE by an enhanced LTE base station. The device comprises a first transmitting module 1701, a first receiving module 1702, a second transmitting module 1703, a second receiving module 1704 and a third transmitting module 1705, wherein:

the first transmitting module is configured to transmit a secondary base station addition request message to a secondary base station with an X2 interface; the first receiving module is configured to receive a secondary base station addition response message transmitted by the secondary base station with the X2 interface, where the secondary base station addition response message carrying configuration information for a UE provided by the secondary base station; the second transmitting module is configured to transmit, to the UE, a RRC message carrying configuration information for the UE provided by the secondary base station with the X2 interface; the second receiving module is configured to receive the RRC message transmitted by the UE after new configuration information is successfully configured; and, the third transmitting module configured to transmit a response information to the secondary base station with the X2 interface.

In the solutions of the present invention, the specific function implementation of each module in the device for establishing a secondary base station for a UE by an enhanced LTE base station provided in Embodiment 13 can refer to the specific steps of the method for establishing a secondary base station for a UE by an enhanced LTE base station provided in Embodiments 6, 7 and 8, and will not be repeated here.

Embodiment 14

Figure 18:
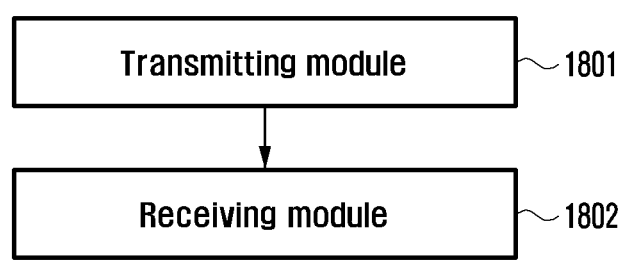
FIG. 18 is a schematic structure diagram of a device for establishing a horizontal interface between an enhanced LTE base station and a neighboring base station according to an embodiment of the present disclosure.

Referring to FIG. 18, based on the method for establishing a horizontal interface between an enhanced LTE base station and a neighboring base station provided in Embodiments 9 and 10, Embodiment 14 of the present invention provides a device for establishing a horizontal interface between an enhanced LTE base station and a neighboring base station. The device comprises a transmitting module 1801 and a receiving module 1802, wherein:

In the solutions of the present invention, the specific function implementations of the modules in the device for establishing a horizontal interface between an enhanced LTE base station and a neighboring base station provided in Embodiment 14 can refer to the specific steps of the method for establishing a horizontal interface between an enhanced LTE base station and a neighboring base station provided in Embodiments 9 and 10, and will not be repeated here.

Embodiment 15

Figure 19:
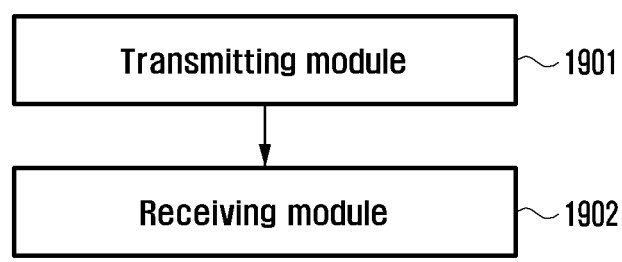
FIG. 19 is a schematic structure diagram of a device for informing a UE about how to configure protocol by an enhanced LTE base station according to an embodiment of the present disclosure.

Referring to FIG. 19, based on the method for informing a UE about how to configure protocol by an enhanced LTE base station provided in Embodiment 11, Embodiment 15 of the present invention provides a device for informing a UE about how to configure protocol by an enhanced LTE base station. The device comprises a transmitting module 1901 and a receiving module 1902, wherein:

In the solutions of the present invention, the specific function implementations of each module in the device for informing a UE about how to configure protocol by an enhanced LTE base station provided in Embodiment 15 can refer to the specific steps of the method informing a configuration protocol UE by an enhanced LTE base station provided in Embodiment 11, and will not be repeated here.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method performed by a user equipment (UE) in a communication system, the method comprising:
acquiring information for a connectivity to a $5^{th}$-generation core network (5GC) of a neighboring cell from a first evolved Node B (eNB) associated with the neighboring cell, wherein the UE is capable of an evolved-universal terrestrial radio access (E-UTRA) and the 5GC;
generating a measurement report including a measurement result of the neighboring cell, based on the information for the connectivity to the 5GC of the neighboring cell; and
transmitting, to a second eNB, the measurement report including the measurement result of the neighboring cell,
wherein the information for the connectivity to the 5GC of the neighboring cell is broadcast in the neighboring cell.

2. The method of claim 1, wherein the measurement result of the neighboring cell includes at least part of the information for the connectivity to the 5GC of the neighboring cell.

3. A user equipment (UE) in a communication system, the UE comprising:
a transceiver; and
a controller configured to:
acquire information for connectivity to a $5^{th}$-generation core network (5GC) of a neighboring cell from a first evolved Node B (eNB) associated with the neighboring cell, wherein the UE is capable of an evolved-universal terrestrial radio access (E-UTRA) and the 5GC,
generate a measurement report including a measurement result of the neighboring cell, based on the information for the connectivity to the 5GC of the neighboring cell, and
transmit, to a second eNB, the measurement report including the measurement result of the neighboring cell,
wherein the information for the connectivity to the 5GC of the neighboring cell is broadcast in the neighboring cell.

4. The UE of claim 3, wherein the measurement result of the neighboring cell includes at least part of the information for the connectivity to the 5GC of the neighboring cell.

5. A method performed by a second evolved Node B (eNB) in a communication system, the method comprising:
receiving, from a user equipment (UE), a measurement report including a measurement result of a neighboring cell,
wherein the measurement result of the neighboring cell is based on information for a connectivity to a $5^{th}$-generation core network (5GC) of the neighboring cell acquired from a first eNB associated with the neighboring cell, the UE being capable of an evolved-universal terrestrial radio access (E-UTRA) and the 5GC, and
wherein the information for the connectivity to the 5GC of the neighboring cell is broadcast in the neighboring cell.

6. The method of claim 5, wherein the measurement result of the neighboring cell includes at least part of the information for the connectivity to the 5GC of the neighboring cell.

7. A second evolved Node B (eNB) in a communication system, the second eNB comprising:
a transceiver; and
a controller configured to receive, from a user equipment (UE), a measurement report including a measurement result of a neighboring cell,
wherein the measurement result of the neighboring cell is based on information for a connectivity to a $5^{th}$-generation core network (5GC) of the neighboring cell acquired from a first eNB associated with the neighboring cell, the UE being capable of an evolved-universal terrestrial radio access (E-UTRA) and the 5GC, and
wherein the information for the connectivity to the 5GC of the neighboring cell is broadcast in the neighboring cell.

8. The second eNB of claim 7, wherein the measurement result of the neighboring cell includes at least part of the information for the connectivity to the 5GC of the neighboring cell.

* * * * *